US008360500B2

(12) United States Patent  
Mishimagi

(10) Patent No.: US 8,360,500 B2  
(45) Date of Patent: Jan. 29, 2013

(54) SIDE VISOR FOR AUTOMOBILE

(75) Inventor: Kazuharu Mishimagi, Tokyo (JP)

(73) Assignee: Hayashi Chemical Industry Co., Ltd., Tokyo (JP)

( * ) Notice: Subject to any disclaimer, the term of this patent is extended or adjusted under 35 U.S.C. 154(b) by 211 days.

(21) Appl. No.: 12/856,829

(22) Filed: Aug. 16, 2010

(65) Prior Publication Data

US 2011/0221226 A1    Sep. 15, 2011

(30) Foreign Application Priority Data

Mar. 15, 2010 (JP) ................................. 2010-057258

(51) Int. Cl.  
*B60J 3/00* (2006.01)

(52) U.S. Cl. .................... 296/97.1; 296/146.1; 296/152; 454/131

(58) Field of Classification Search ................ 296/97.1, 296/146.1, 146.9, 152, 154, 181.5; 454/131, 454/133, 135  
See application file for complete search history.

(56) References Cited

U.S. PATENT DOCUMENTS

| | | | | |
|---|---|---|---|---|
| 1,628,053 | A * | 5/1927 | McTighe | 454/132 |
| 2,199,134 | A * | 4/1940 | Johnson | 296/152 |
| 2,318,143 | A * | 5/1943 | Cutting | 296/152 |
| 5,251,953 | A * | 10/1993 | Willey | 296/152 |
| 5,292,168 | A * | 3/1994 | Mykytiuk et al. | 296/97.8 |
| 5,683,293 | A * | 11/1997 | Mohammed | 454/132 |
| 5,797,645 | A * | 8/1998 | Schenk et al. | 296/152 |
| 7,204,543 | B2 * | 4/2007 | Mishimagi | 296/152 |

FOREIGN PATENT DOCUMENTS

| | | |
|---|---|---|
| JP | 11-268519 | 10/1999 |
| JP | 2000-313231 | 11/2000 |
| JP | 2001-26212 | 1/2001 |

* cited by examiner

*Primary Examiner* — Glenn Dayoan  
*Assistant Examiner* — Pinel Romain  
(74) *Attorney, Agent, or Firm* — Greenblum & Bernstein P.L.C.

(57) ABSTRACT

A first covering part of the present invention covers a portion from the front part to the upper part of a door window and expands to the outside in the vehicle width direction, and the lower surface thereof is open. A second covering part covers a portion lower than the first covering part of the upper part of the door window, is provided so as to be on the outside of a window glass and be located on the inside in the vehicle width direction of the lower edge of the first covering part, and is formed so as to gradually approach the window glass from the rear end toward the front end, the lower edge thereof being provided close to the outer surface of the window glass. A third covering part covers a portion between the first and second covering parts in the upper part of the door window by integrally connecting a portion located in the upper part of the door window of the lower edge of the first covering part and the upper edge of the second covering part, and is provided in such a manner as to be curved so as to project to the upside, and extend to the slantwise upside from the front end toward the rear end and extend to the slantwise upside from the upper edge of the second covering part toward the lower edge of the first covering part in the vehicle width direction. In the front part of the third covering part, a plurality of through holes are provided.

9 Claims, 19 Drawing Sheets

SIDE VISOR FOR AUTOMOBILE

BACKGROUND OF THE INVENTION

1. Field of the Invention

The present invention relates to a side visor that is mounted to a window frame of a side door of a cab-over-engine type automobile or a cab-behind-engine type automobile and is suitable for ventilation in a cabin.

2. Description of the Related Art

Conventionally, as the side visor of this type, there has been known a side visor 1 that is mounted to a window frame 3a defining a door window 3b of a side door 3 of a cab-over-engine truck 5 and covers the front part and the upper part of the door window 3b from the outside as shown in FIG. 20. For this side visor 1, the door window 3b is closed openably by a window glass 3c. For the side visor 1 configured as described above, when the cabin is ventilated, the window glass 3c is lowered so that the upper edge of the window glass 3c is located slightly lower than the lower edge of the side visor 1. At this time, a relatively high-speed air flow directed from the front part of the side visor 1 toward the rear part thereof is produced along the outer surface of the side visor 1 by the running of the truck 5. Therefore, a negative pressure is developed in a front gap of the gap between the lower edge of the side visor 1 and the upper edge of the window glass 3c, and the air in the cabin is discharged to the outside of the vehicle through the front gap by the negative pressure.

For the above-described conventional side visor, the gap between the lower edge of the side visor and the upper edge of the window glass extends relatively long from the front part to the rear part of the side visor, which poses a problem that the air in the cabin discharged through the front gap of the gap between the lower edge of the side visor and the upper edge of the window glass intrudes again into the cabin through a rear gap of the gap between the lower edge of the side visor and the upper edge of the window glass.

To solve this problem, a side visor for automobile configured described below has been disclosed. In this side visor for automobile, a fitting part is mounted in an upper part of a window opening part of a vehicle body so as to be formed continuously from an upper edge over front and rear edges, and a visor main body part is formed so as to expand from the fitting part toward the outside. Also, an elastic sealing piece that is in contact with the window glass is projectingly provided at the lower edge of the inner surface of the visor main body part, so that an internal space surrounded by the fitting part and the elastic sealing piece is formed (for example, refer to Patent Document 1). In this side visor for automobile, a tunnel-like ventilation path leading from a front air intake port to a rear air outlet port is formed in the visor main body part, and draft ports communicating with the internal space are formed in the inner wall surface of the ventilation path. Three draft ports are provided in parallel in a grill plate welded to the inner wall surface. Each of the draft ports is open in a longitudinally long slantwise rectangular shape with the upside being directed to the rear, and a fin directed to the outside is projectingly provided at the rear at the front edge of each of the draft ports.

For the side visor for automobile configured as described above, since the elastic sealing piece that is in contact with the window glass is projectingly provided at the lower edge on the inner surface of the visor main body part, running wind can be prevented from intruding into the internal space of the visor main body part. In particular, since the internal space of the visor main body part is integrated with the cabin, ventilation can be provided efficiently. Also, since the tunnel-like ventilation path is formed in the visor main body part, and the draft ports are provided in the inner wall surface of the ventilation path, the draft ports become in a state of being covered with the outer wall surface of the ventilation path. As a result, the intrusion of rain water blown against the side surface of vehicle body can be prevented. Also, since the draft ports are not exposed to the outside of vehicle, the generation of wind noise caused by the draft ports can be prevented.

On the other hand, an automobile member for accelerating discharge of interior air has been disclosed in which two elongated outer and inner blades disposed in parallel so as to be separated from each other extend along a front pillar of automobile, and are mounted to the front pillar so as to be in parallel with a side glass, and two or more bridge plates for bridging the outer blade and the inner blade are mounted substantially in parallel with the ground (for example, refer to Patent Document 2). This automobile member for accelerating discharge of interior air is formed so that the front side of a gap between the two blades is wide and the rear side thereof is narrow, and that the gap between the two blades becomes narrower gradually toward the rear side. The outer blade is configured so that the thickness thereof increases gradually from the front side toward the rear side and becomes at a maximum at 40 to 50% of blade width, and thereafter the thickness decreases gradually again.

For the automobile member for accelerating discharge of interior air configured as described above, the wind passing through the front pillar intrudes between the two blades during the running, and the intruding wind passes through the gap between the two blades and is discharged immediately to the rear at a high speed. Therefore, during the time when the side glass is being opened, the discharge of air in the cabin is accelerated by the wind discharged at a high speed. Thus, the air in the cabin can be discharged to the outside of vehicle efficiently by a simple construction requiring no power and at a low cost.

Patent Document 1: Japanese Unexamined Patent Application Publication No. 2000-313231 (claim 1, paragraphs [0020], [0021] and [0014], FIGS. 1 to 3)

Patent Document 2: Japanese Unexamined Patent Application Publication No. 2001-26212 (claim 1, paragraph [0033], FIGS. 1 to 3 and 7)

Unfortunately, for the conventional side visor for automobile described in Patent Document 1, the grill plate must be welded to the inner wall surface, which poses problems of increased number of parts of the side visor and increased man power for manufacturing the side visor. Also, for the conventional side visor for automobile described in Patent Document 1, the plurality of fins directed to the outside are projectingly provided at the rear at the front edges of the plurality of the draft ports, which also poses a problem that an eddy current is generated at the rear of each of the fins, which increases wind noise.

On the other hand, for the conventional automobile member for accelerating discharge of interior air described in Patent Document 2, the elongated outer and inner blades and the two or more bridge plates for bridging these blades are required, and these elements must be bonded to each other, which poses problems of increased number of parts of the discharge accelerating member and increased man power for manufacturing the discharge accelerating member. Also, for the conventional automobile member for accelerating discharge of interior air described in Patent Document 2, in the case where the discharge accelerating member is mounted to the front pillar of a passenger car, which is a cab-behind-engine type automobile, since the angle that the front pillar makes with the flow direction of air flow produced by the running of the passenger car is small, the height of the discharge accelerating member becomes small, and the width for drawing the air in the cabin from the discharge accelerating member becomes narrow, which poses a problem of decreased ventilation efficiency in the cabin.

SUMMARY OF THE INVENTION

A first object of the present invention is to provide a side visor for automobile capable of ventilating a cabin efficiently without increase in the number of parts and the manpower for manufacture and with scarce generation of wind noise. A second object of the present invention is to provide a side visor for automobile capable of rapidly discharging the air in the cabin through a through hole while preventing the air in the cabin discharged to the outside of vehicle through the through hole from intruding again into the cabin and while restraining the strength near the through hole from decreasing.

A first aspect of the present invention is, as shown in FIGS. 1, 3, 6 and 7, a side visor for automobile that is mounted to a window frame 13*a* defining a door window 13*b* of a side door 13 to cover the front part and upper part of the door window 13*b* from the outside, including a first covering part 21 configured so as to cover a portion from the front part to the upper part of the door window 13*b* and expand to the outside in the vehicle width direction and so that the lower surface thereof is open; a second covering part 22 that covers a portion lower than the first covering part 21 of the upper part of the door window 13*b*, is provided so as to be on the outside of a window glass 13*c* that openably closes the door window 13*b*, and be located on the inside in the vehicle width direction of the lower edge of the first covering part 21, and is formed so as to gradually approach the window glass 13*c* from the rear end toward the front end, the lower edge thereof being provided close to the outer surface of the window glass 13*c*; a third covering part 23 that covers a portion between the first and second covering parts 21 and 22 in the upper part of the door window 13*b* by integrally connecting a portion located in the upper part of the door window 13*b* of the lower edge of the first covering part 21 and the upper edge of the second covering part 22, and is provided in such a manner as to be curved so as to project to the upside, and extend to the slantwise upside from the front end toward the rear end and extend to the slantwise upside from the upper edge of the second covering part 22 toward the lower edge of the first covering part 21 in the vehicle width direction; and a single or a plurality of through holes 23*a* and 23*b* provided in the front part of the third covering part 23.

A second aspect of the present invention is an invention based on the first aspect, in which as shown in FIGS. 1 and 7, a single or a plurality of ribs 17 and 18 are provided from the single or the plurality of through holes 23*a* and 23*b* to the outer surface of the second covering part 22 so as to extend substantially to the horizontal direction.

A third aspect of the present invention is an invention based on the first aspect, in which as shown in FIGS. 1 and 3, a rubber-made molding 16 is mounted along the lower edge of the second covering part 22 so that the configuration is made such that the tip end of the molding 16 is further close to the outer surface of the window glass 13*c*.

A fourth aspect of the present invention is an invention based on the first aspect, in which as shown in FIG. 18, the single through hole 63*a* is provided so as to be curved upward from the front end of the third covering part 63 and extend to the lengthwise direction of the third covering part 63.

A fifth aspect of the present invention is an invention based on the second aspect, in which as shown in FIG. 18, the single through hole 63*a* is provided so as to be curved upward from the front end of the third covering part 63 and extend to the lengthwise direction of the third covering part 63.

A sixth aspect of the present invention is an invention based on the third aspect, in which as shown in FIG. 18, the single through hole 63*a* is provided so as to be curved upward from the front end of the third covering part 63 and extend to the lengthwise direction of the third covering part 63.

A seventh aspect of the present invention is an invention based on the first aspect, in which as shown in FIG. 1, the plurality of through holes 23*a* and 23*b* are provided so as to be curved upward from the front end of the third covering part 23 and extend along the lengthwise direction of the third covering part 23.

An eighth aspect of the present invention is an invention based on the second aspect, in which as shown in FIG. 1, the plurality of through holes 23*a* and 23*b* are provided so as to be curved upward from the front end of the third covering part 23 and extend along the lengthwise direction of the third covering part 23.

A ninth aspect of the present invention is an invention based on the third aspect, in which as shown in FIG. 1, the plurality of through holes 23*a* and 23*b* are provided so as to be curved upward from the front end of the third covering part 23 and extend along the lengthwise direction of the third covering part 23.

For the side visor of the first aspect of the present invention, when the window glass is lowered so that the upper edge of the window glass is located slightly above the lower edge of the side visor to ventilate a cabin, an air flow directed from the front part of the side visor toward the rear part thereof is produced along the outer surface of the side visor by the running of the automobile. This air flow is made faster by passing through the outer surface of the first covering part expanding to the outside in the vehicle width direction, and is further accelerated by successively passing through the outer surface of the third covering part and the outer surface of the second covering part. As a result, by a high-speed air flow passing through the outsides of the through holes of the third covering part, the static pressure of air on the outsides of the through holes is made extremely low with respect to the static pressure of air in the cabin, so that the air in the cabin is drawn through the opened door window and through holes, and is discharged to the outside of the cabin rapidly. Therefore, the cabin can be ventilated with high efficiency.

For example, for the conventional automobile member for accelerating discharge of interior air, in the case where the discharge accelerating member is mounted to the front pillar of a passenger car, which is a cab-behind-engine type automobile, since the angle that the front pillar makes with the flow direction of air flow produced by the running of the passenger car is small, the height of the discharge accelerating member becomes small, and the width in the vertical direction for drawing the air in the cabin from the discharge accelerating member becomes narrow, so that the ventilation efficiency in the cabin decreases. In contrast, in the case where the side visor of the present invention is mounted to the window frame of the side door of the passenger car, when the window glass is lowered to open the front part and upper part of the door window, although the height of the front part of the opened door window is small, and therefore the width in the vertical direction for drawing the air in the cabin through the front part of the opened door window is narrow, by the formation of the through holes in the front part of the third covering part, the air in the cabin can be drawn also through the through holes in addition to the front part of the opened door window. That is, in the present invention, the air in the cabin can be drawn from a relatively wide width in the vertical direction that is a width obtained by adding the widths in the vertical direction of the through holes to the width in the vertical direction of the front part of the opened door window. Therefore, the cabin can be ventilated with high efficiency.

Also, since the second covering part is formed so as to gradually approach the window glass from the rear end toward the front end, that is, the second covering part is formed so as to gradually separate from the window glass from the front end toward the rear end, the air flow having drawn the air in the cabin flows smoothly along the outer surface of the second covering part without coming off the outer surface of the second covering part. As a result, in the present invention, wind noise is scarcely generated, and the cab can be ventilated with high efficiency as compared with the conventional side visor for automobile in which because a plurality of fins directed to the outside are projectingly provided at the rear at the front edges of a plurality of the draft ports, an eddy current is generated at the rear of each of the fins, which increases wind noise.

Also, since the lower edge of the second covering part is provided close to the outer surface of the window glass, the air in the cabin discharged to the outside of the cabin through the through holes can be prevented from intruding again into the cabin. Further, as compared with the conventional side visor for automobile in which since a grill plate is welded to the inner wall surface, the number of parts and manufacturing manpower of the side visor increase, and the conventional automobile member for accelerating discharge of interior air in which since two or more bridge plates are bonded to outer and inner blades, the number of parts and manufacturing manpower of the discharge accelerating member increase, in the present invention, since the first and second covering parts are integrally connected to each other by the third covering part, the number of parts and manufacturing manpower of the side visor need not be increased.

For the side visor of the second aspect of the present invention, since the single or the plurality of ribs are provided from the single or the plurality of through holes to the outer surface of the second covering part so as to extend substantially to the horizontal direction, the air in the cabin drawn through the throughholes is straightened, and the strength near the through holes of the side visor is increased. As a result, since the air flow caused by the running of the automobile flows smoothly along the outer surface of the side visor from the front part toward the rear part thereof, wind noise is scarcely generated, and the decrease in strength of the side visor caused by the formation of the through holes can be restrained.

For the side visor of the third aspect of the present invention, since the configuration is made such that the tip end of the rubber-made molding mounted along the lower edge of the second covering part is further close to the outer surface of the window glass, even if an external force is applied to the side visor and the tip end of the molding comes into contact with the outer surface of the window glass, the window glass and the molding are not damaged. Therefore, a gap between the lower edge of the second covering part and the window glass can be made extremely small. As a result, the air in the cabin discharged to the outside of the cabin through the through holes can be prevented almost reliably from intruding again into the cabin.

For the side visors of the fourth to sixth aspects of the present invention, since the single through hole is provided so as to be curved upward from the front end of the third covering part and extend to the lengthwise direction of the third covering part, the width in the vertical direction of the through hole for drawing the air in the cabin increases. As a result, the air in the cabin can be drawn easily, so that the cabin can be ventilated with high efficiency.

For the side visors of the seventh to ninth aspects of the present invention, since the plurality of through holes are provided so as to be curved upward from the front end of the third covering part and extend along the lengthwise direction of the third covering part, the width in the vertical direction of the through holes for drawing the air in the cabin increases, and also the through holes can be made relatively small. As a result, the air in the cabin can be drawn easily, so that the cabin can be ventilated with high efficiency. Also, since the strength near the through holes of the side visor increases, the decrease in strength of the side visor caused by the formation of the through holes can be restrained.

DETAILED DESCRIPTION OF THE PREFERRED EMBODIMENTS

Embodiments for carrying out the present invention will now be described with reference to the accompanying drawings.

First Embodiment

Figure 8:
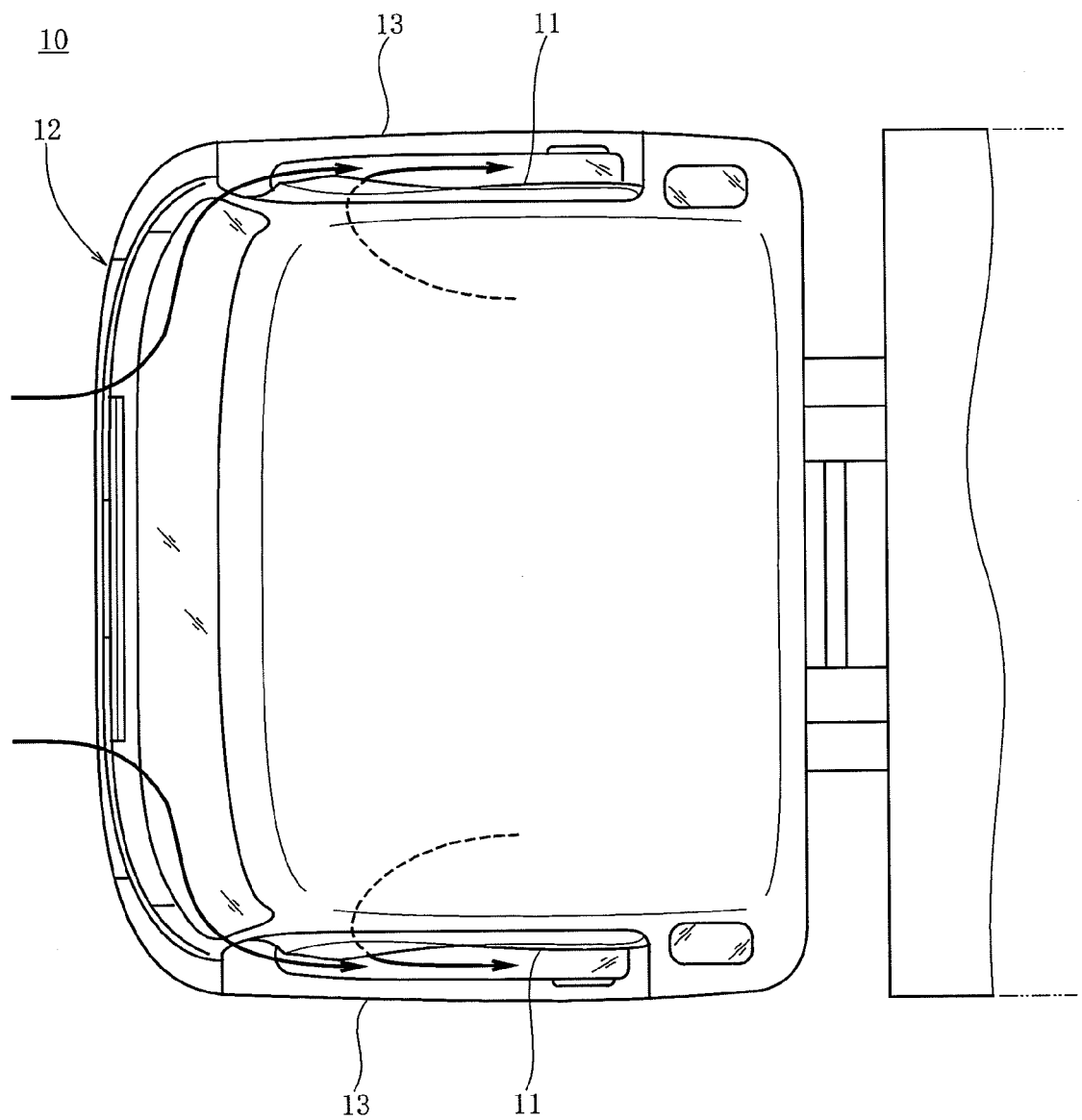
FIG. 8 is a plan view of a cab of a truck (cab-over-engine type automobile) to which the side visor shown in FIG. 1 is mounted.
Figure 9:
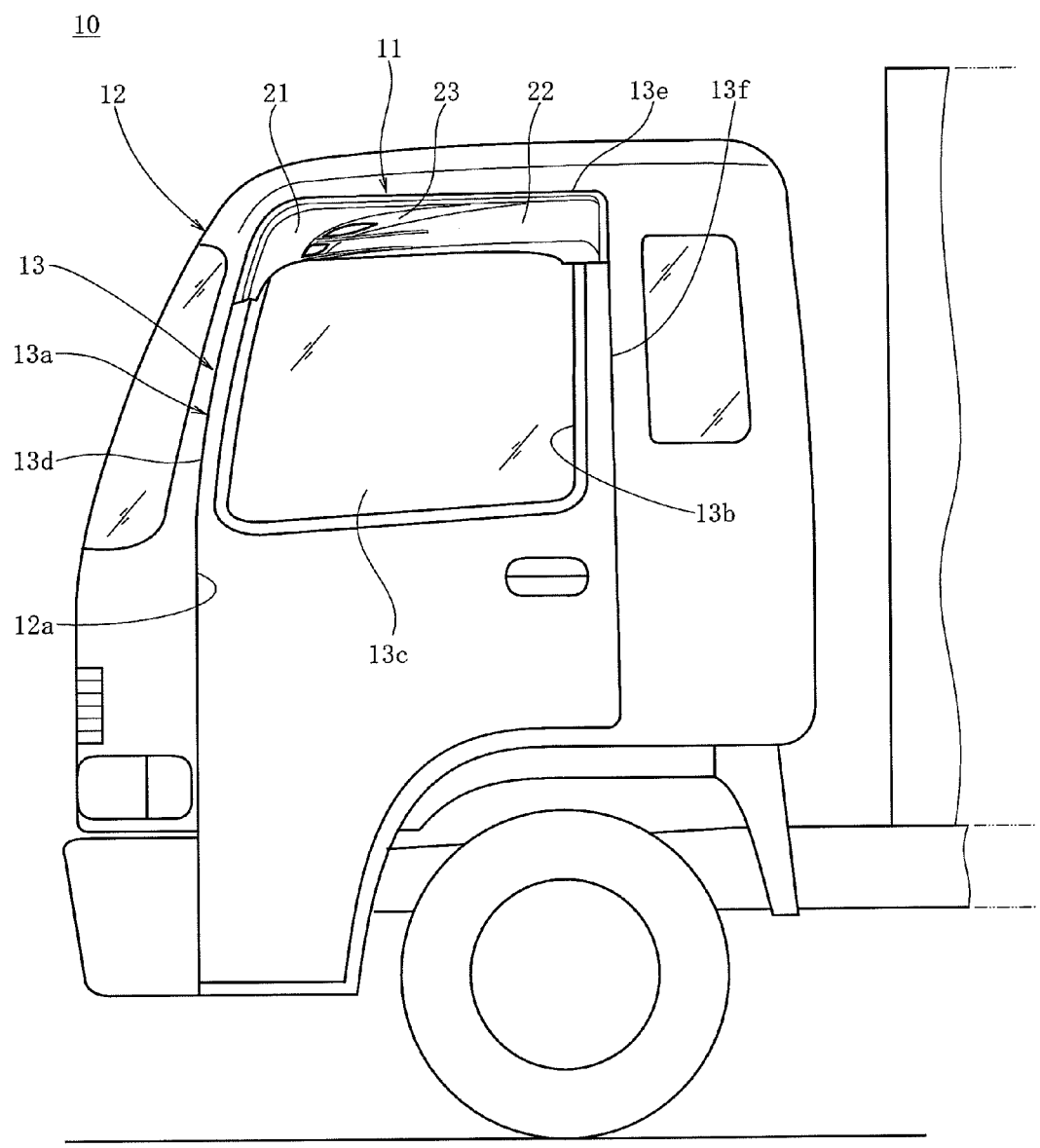
FIG. 9 is a side view of a cab of a truck (cab-over-engine type automobile) to which the side visor shown in FIG. 1 is mounted.

As shown in FIGS. 8 and 9, a side visor 11 of a first embodiment is mounted to a side door 13 of a cab-over-engine truck 10. Since the side visor 11 is symmetrical in the right-and-left direction with respect to the centerline of vehicle body, the side visor 11 mounted to the side door 13 on the assistant driver's seat side is explained exemplarily, and the explanation of the side visor 11 mounted to the side door 13 on the driver's seat side is omitted (FIG. 8). In the side surface of a cab 12 of the truck 10, a port 12a through which one gets on and off is provided, and this port 12a is closed openably by the side door 13 (FIG. 9). In the upper part of the side door 13, a door window 13b defined by a window frame 13a is formed, and the door window 13b is closed and opened by moving the window glass 13c up and down. The window frame 13a has a front frame part 13d provided on the front side of the side door 13 in such a manner as to be erected so as to be tilted slightly to the rear from the vertical direction, an upper frame part 13e extending to the travel direction of the truck 10, and a rear frame part 13f provided on the rear side of the side door 13 so as to be erected substantially in the vertical direction. Also, the side door 13 is configured so that by moving the window glass 13c up, the door window 13b is closed by the window glass 13c, and by moving the window glass 13c down, the door window 13b is opened.

Figure 1:
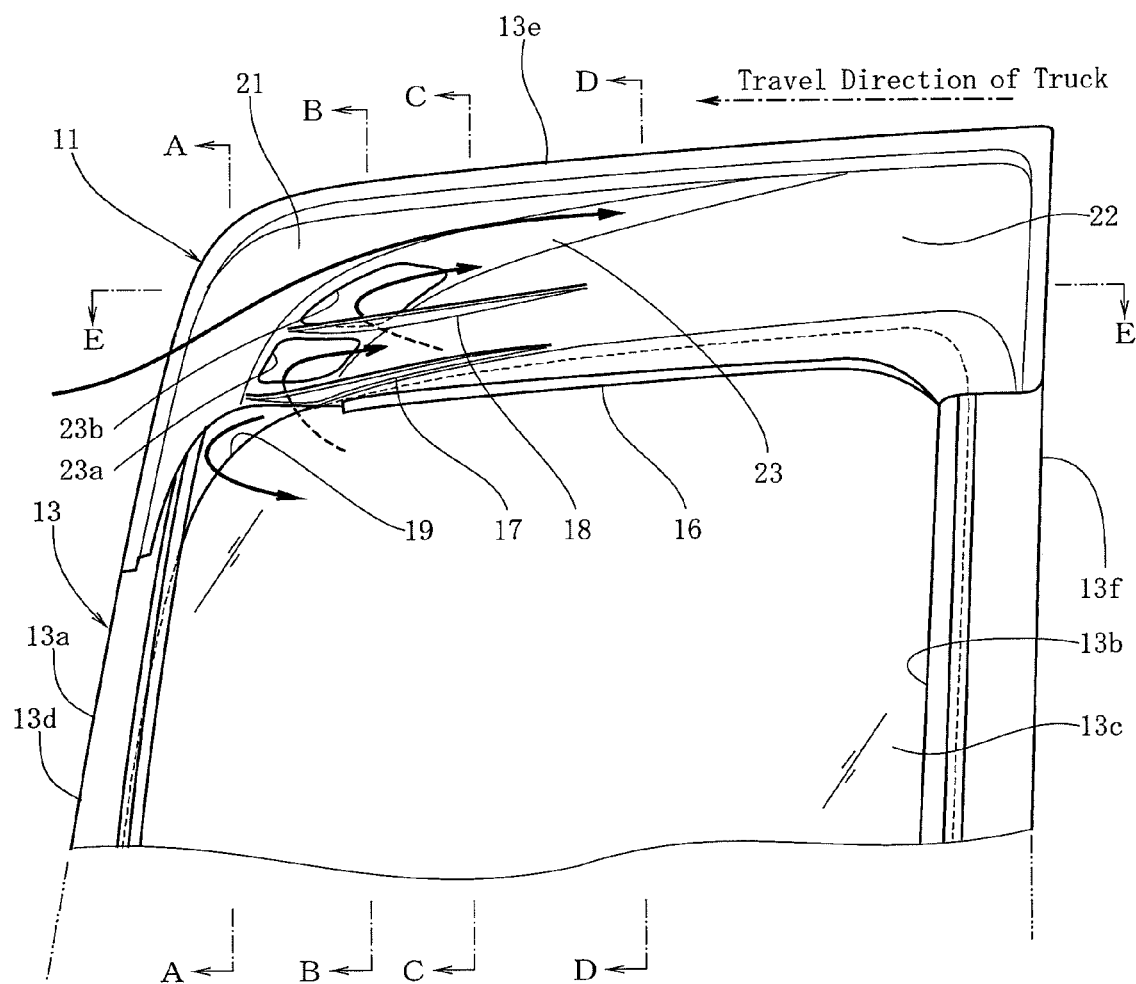
FIG. 1 is a perspective view of an essential portion of a side door of a truck (cab-over-engine type automobile) to which a side visor in accordance with a first embodiment of the present invention is mounted, the side door being viewed substantially from the front.
Figure 2:
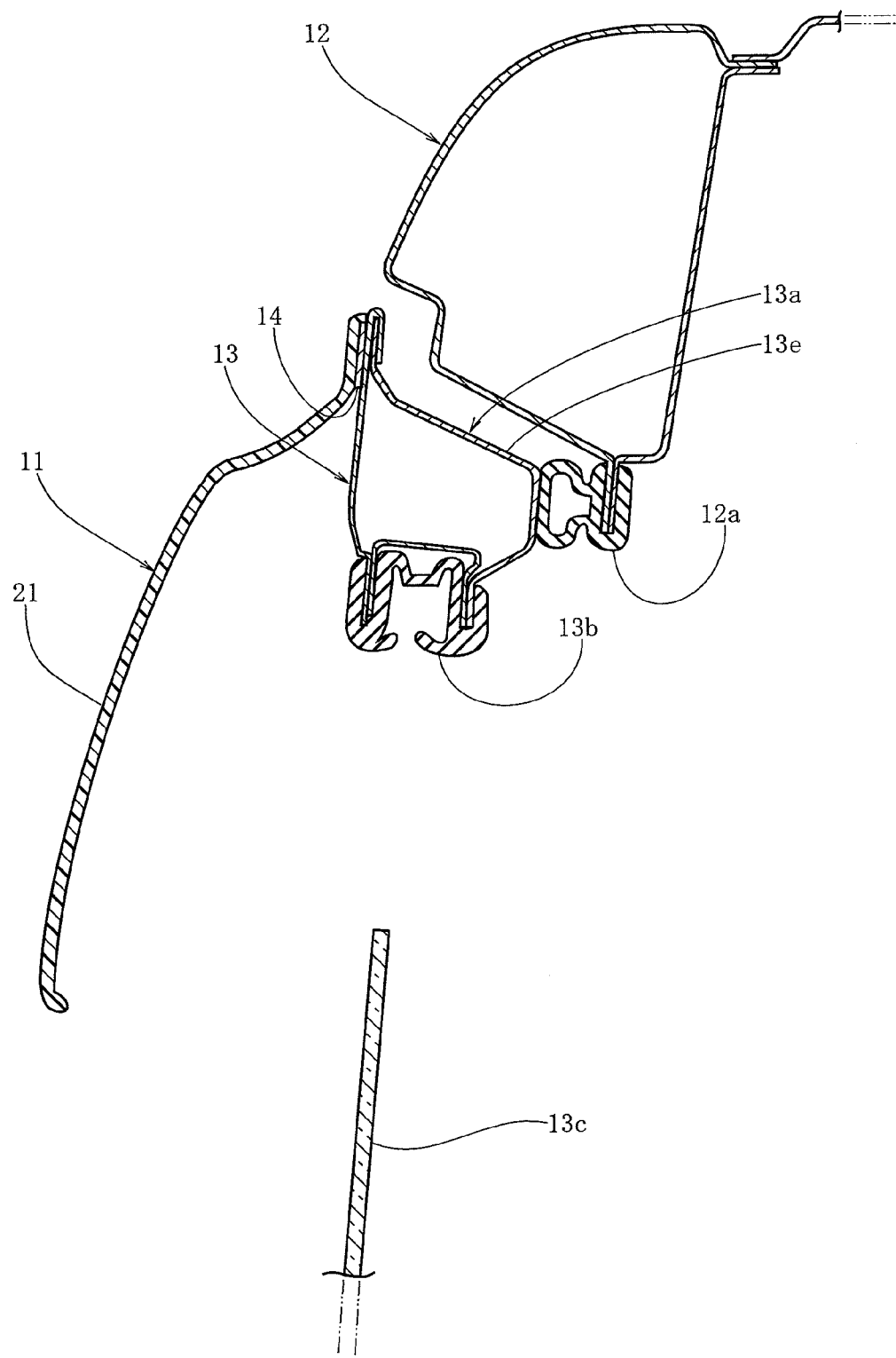
FIG. 2 is a sectional view taken along the line A-A of FIG. 1.
Figure 6:
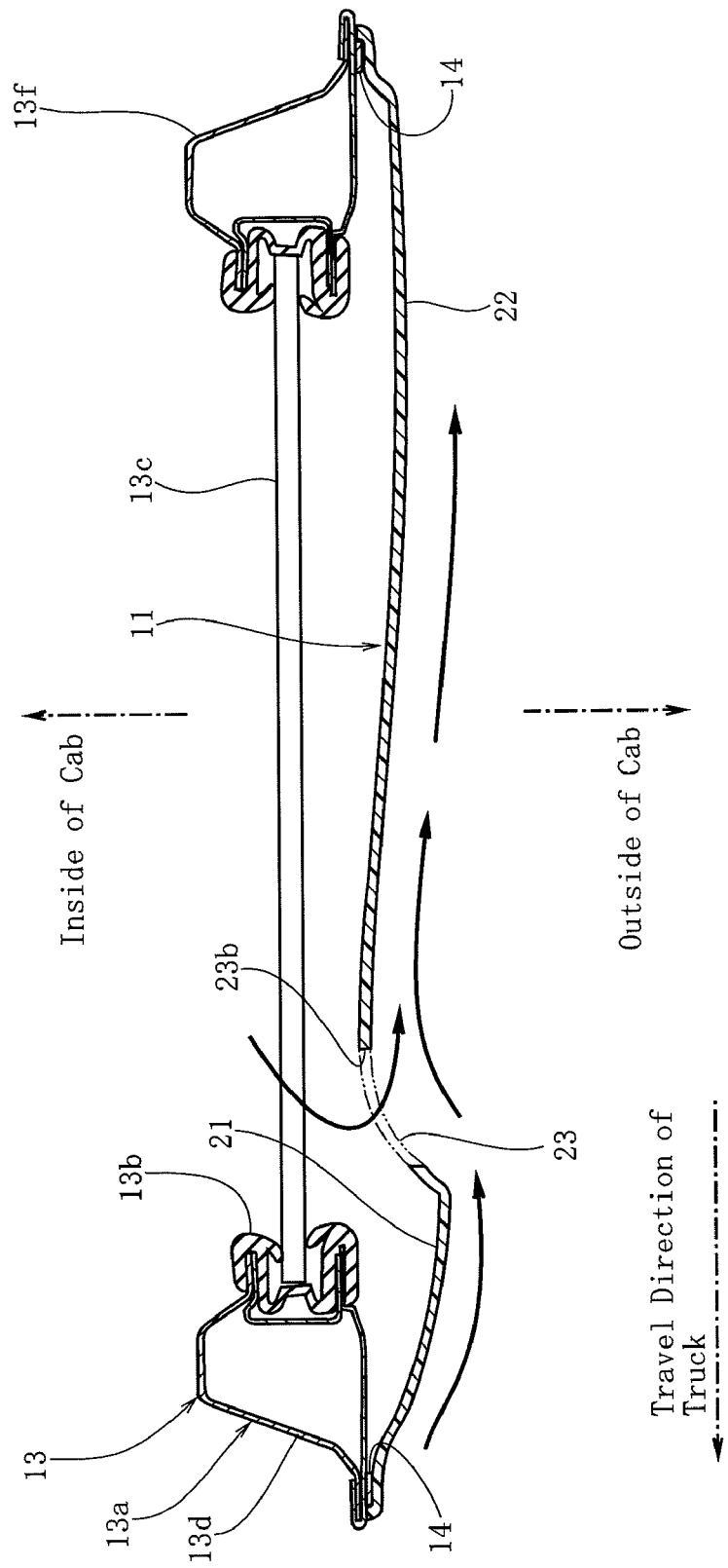
FIG. 6 is a sectional view taken along the line E-E of FIG. 1.
Figure 7:
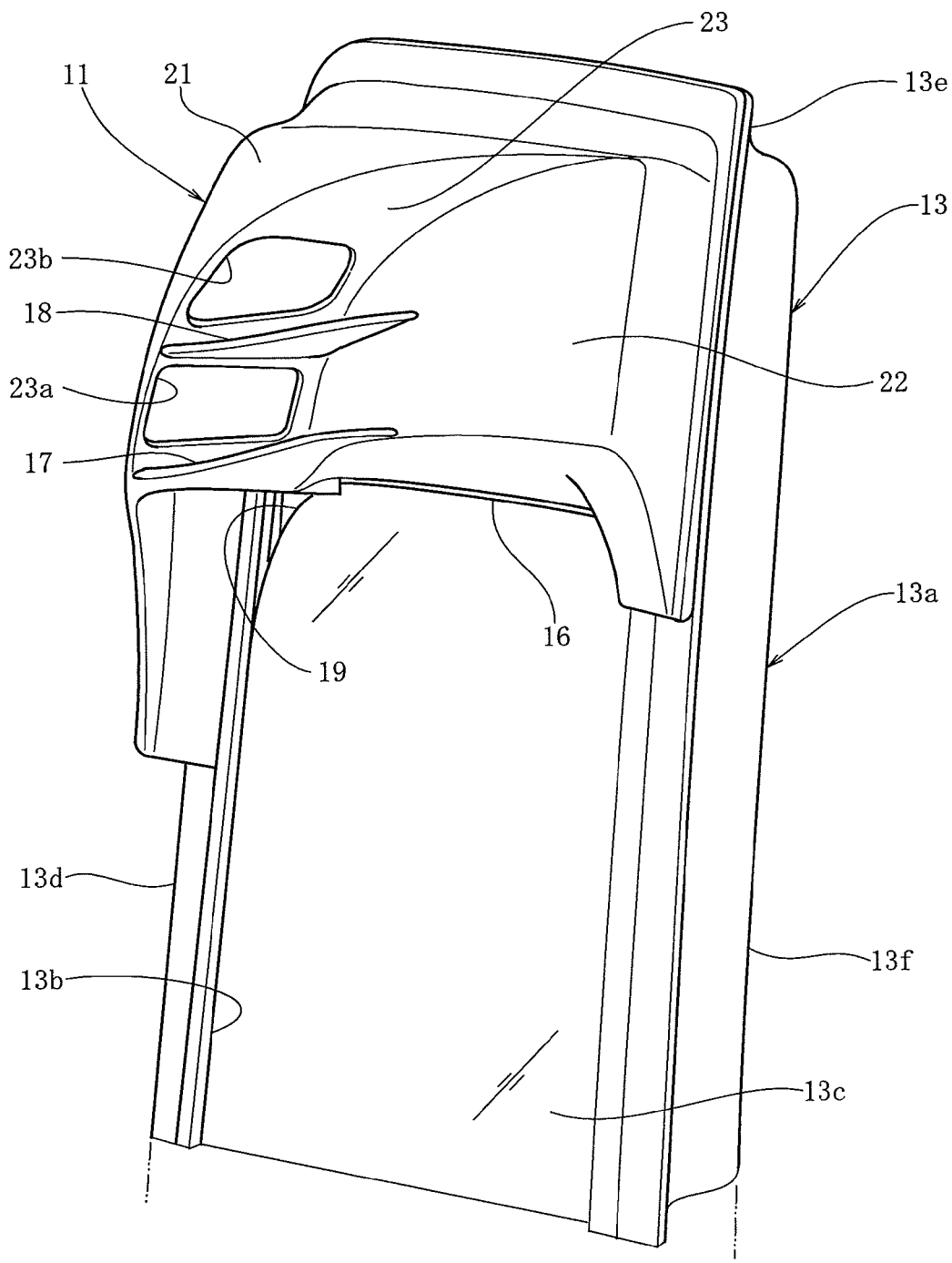
FIG. 7 is a perspective view of an essential portion of a side door to which the side visor shown in FIG. 1 is mounted, the side door being viewed from the slantwise rear.

The side visor 11 is mounted to the front frame part 13d, the upper frame part 13e, and the rear frame part 13f of the window frame 13a with a pressure sensitive adhesive double coated tape 14 (FIGS. 2 to 6), and is configured so as to cover the front part and the upper part of the door window 13b from the outside (FIGS. 1, 7 and 9). The side visor 11 is provided with a first covering part 21 covering a portion from the front part to the upper part of the door window 13b, a second covering part 22 covering a portion lower than the first covering part 21 of the upper part of the door window 13b, a third covering part 23 covering a portion between the first and second covering parts 21 and 22 in the upper part of the door window 13b by integrally connecting a portion located in the upper part of the door window 13b of the lower edge of the first covering part 21 and the upper edge of the second covering part 22, and two through holes 23a and 23b provided in the front part of the third covering part 23 (FIGS. 1 and 7). The first to third covering parts 21 to 23 are formed integrally by injection molding of a translucent plastic. The first to third covering parts 21 to 23 may be integrally formed of an opaque plastic, not a translucent plastic, or may be integrally formed of a transparent plastic in the case where the side visor need not have a function of sunshade and needs to have only a function of ventilation in the cabin.

The first covering part 21 is configured so as to expand to the outside in the vehicle width direction and so that the lower surface thereof is open (FIGS. 1 to 5). Also, the first covering part 21 is formed so that the width in the travel direction of the truck 10 decreases gradually toward the lower front and is accommodated in the width of the front frame part 13d, and so that the width in the vertical direction decreases gradually toward the upper rear and is accommodated in the width of the upper frame part 13e (FIG. 1). Further, the front rear edge of the first covering part 21 is formed curvedly so as to project to the front, and the upper lower edge of the first covering part 21 is formed curvedly so as to project to the upside.

Figure 3:
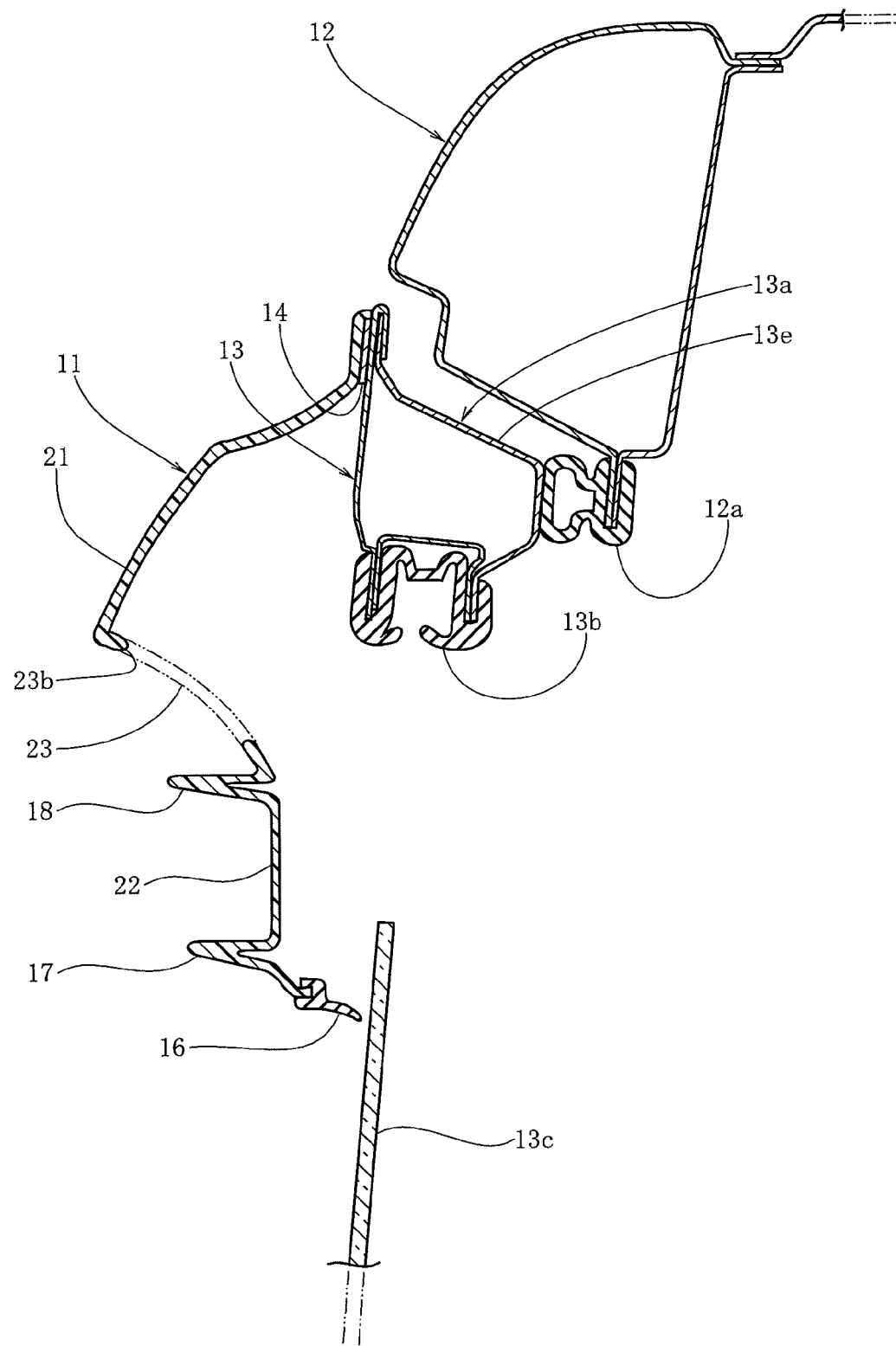
FIG. 3 is a sectional view taken along the line B-B of FIG. 1.
Figure 4:
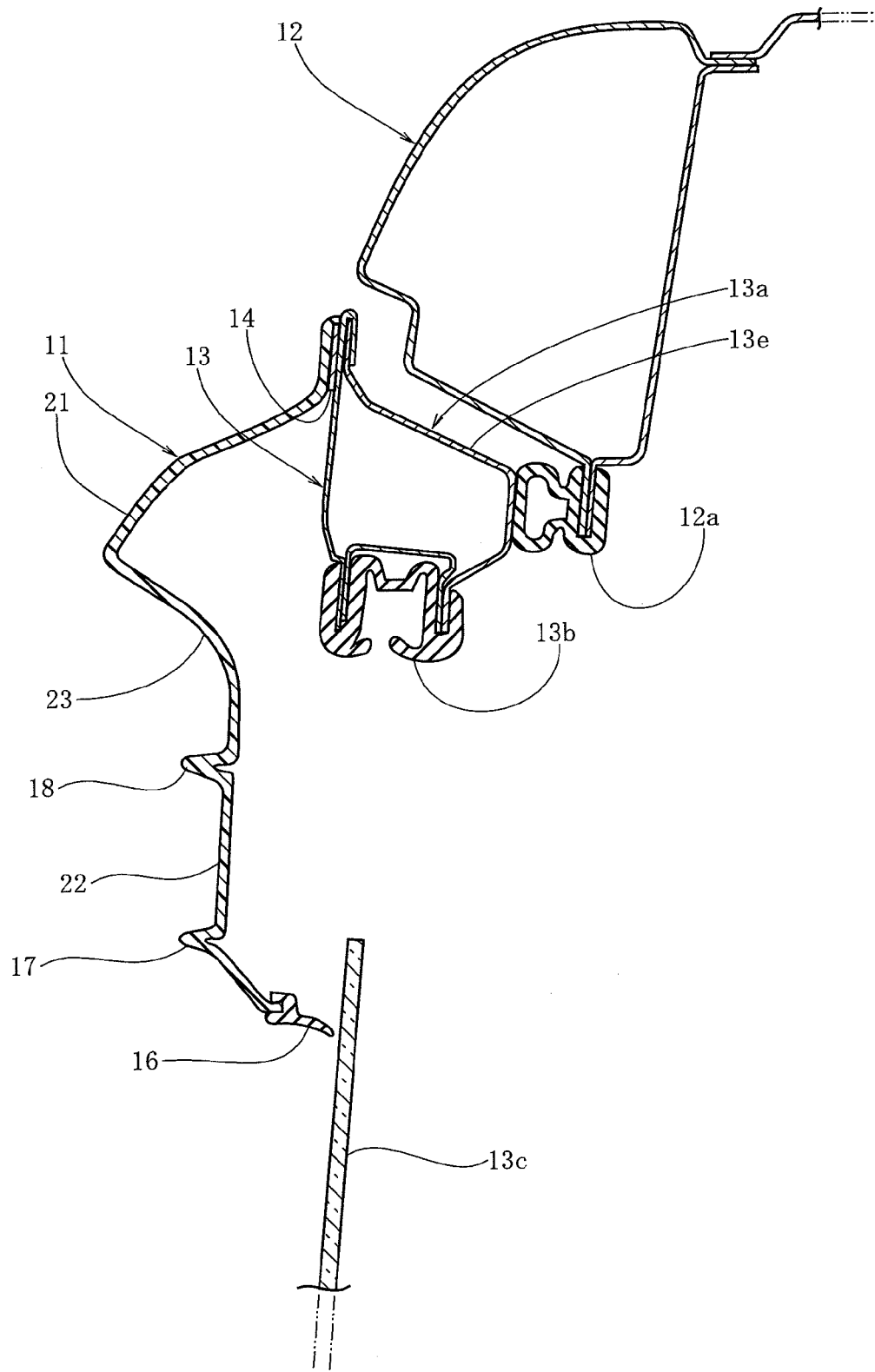
FIG. 4 is a sectional view taken along the line C-C of FIG. 1.
Figure 5:
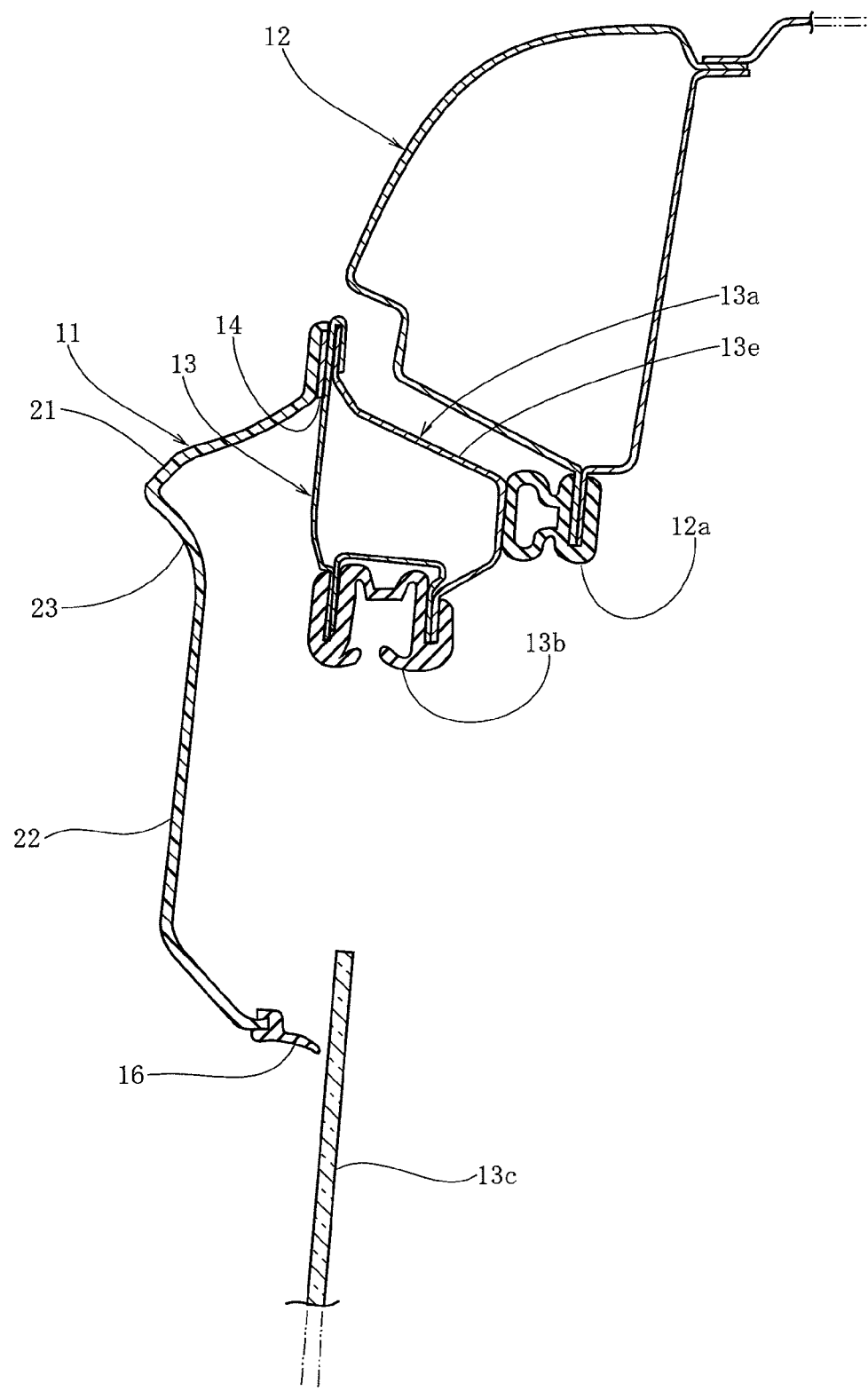
FIG. 5 is a sectional view taken along the line D-D of FIG. 1.

The second covering part 22 is provided so as to be on the outside of the window glass 13c that closes the door window 13b, and be located on the inside in the vehicle width direction of the lower edge of the first covering part 21 (FIGS. 3 to 5). Also, the second covering part 22 is formed so as to gradually approach the window glass 13c from the rear end toward the front end, in other words, is formed so as to gradually separate from the window glass 13c from the front end toward the rear end (FIG. 6). Also, the second covering part 22 is formed so that the width in the vertical direction decreases gradually from the rear end toward the front end, in other words, is formed so that the width in the vertical direction increases gradually from the front end toward the rear end (FIG. 1). The upper edge of the second covering part 22 is formed curvedly so as to project to the upside. Further, the lower edge of the second covering part 22 is formed so as to extend to the travel direction of the truck 10 (FIG. 1), is projectingly provided toward the outer surface of the window glass 13c in the vehicle width direction, and is provided close to the outer surface of the window glass 13c (FIGS. 3 to 5). At the lower edge of the second covering part 22, a rubber-made molding 16 is mounted along the lower edge thereof. The molding 16 is configured so that the tip end thereof projects toward the outer surface of the window glass 13c and comes closer to the outer surface of the window glass 13c than the lower edge of the second covering part 22.

The third covering part 23 is provided in such a manner as to be curved so as to project to the upside, and extend to the slantwise upside from the front end toward the rear end. Also, the third covering part 23 is provided so as to extend to the slantwise upside from the upper edge of the second covering part 22 toward the lower edge of the first covering part 21 in the vehicle width direction. Further, the front part of the third covering part 23 is formed curvedly so as to project toward the window glass 13c in the vehicle width direction (FIGS. 3 and 6). The radius of curvature of a curved portion in the front part of the third covering part 23 is set relatively large. On the other hand, the two through holes 23a and 23b are disposed along the lengthwise direction of the third covering part 23 so as to be curved upward from the front end of the third covering part 23. Also, two ribs 17 and 18 are provided from the lower edges of the two through holes 23a and 23b to the outer surface of the second covering part 22 so as to extend substantially to the horizontal direction. These ribs 17 and 18 are formed integrally with the first to third covering parts 21 to 23 (FIGS. 3 and 4). Further, the ribs 17 and 18 are formed so that the heights thereof are at a maximum in a connecting portion between the second covering part 22 and the third covering part 23. The ribs 17 and 18 are formed so that the heights thereof decrease gradually from the connecting portion toward the front, and decrease gradually from the connecting portion toward the rear. However, the tip end faces (upper faces) of the ribs 17 and 18 are configured in a gentle curved shape close to a straight line over the lengthwise direction of the rib 17, 18.

The operation of the side visor 11 for the truck 10 configured as described above is explained. When a cab 12 is ventilated during the time when the truck 10 is running, the window glass 13c is lowered so that the upper edge of the window glass 13c is located slightly above the lower edge of the side visor 11, that is, the window glass 13c is lowered so that the tip end of the molding 16 of the side visor 11 projects toward the outer surface slightly lower than the upper end of the window glass 13c (FIG. 1). At this time, an air flow directed from the front part of the side visor 11 toward the rear part thereof is produced along the outer surface of the side visor 11 by the running of the truck 10. This air flow is made faster by passing through the outer surface of the first covering part 21 expanding to the outside in the vehicle width direction, and is further accelerated by successively passing through the outer surface of the third covering part 23 and the outer surface of the second covering part 22. As a result, by a high-speed air flow passing through the outsides of the through holes 23a and 23b of the third covering part 23, the static pressure of air on the outsides of the through holes 23a and 23b is made extremely low with respect to the static pressure of air in the cab 12, and the static pressure of air on the outside of an opening 19 between the front rear edge of the side visor 11 and the front upper edge of the window glass 13c is made extremely low with respect to the static pressure of air in the cab 12. Therefore, the air in the cab 12 is drawn through the opened through holes 23a and 23b and opening 19, and is discharged to the outside of the cab 12 rapidly. Also, since the second covering part 22 is formed so as to gradually approach the window glass 13c from the rear end toward the front end, that is, the second covering part 22 is formed so as to gradually separate from the window glass 13c from the front end toward the rear end, when passing through the outsides of the through holes 23a and 23b, the air flow having drawn the air in the cab 12 flows smoothly along the outer surface of the second covering part 22 without coming off the outer surface of the second covering part 22 (FIG. 6). As a result, wind noise is scarcely generated, and the cab 12 can be ventilated with high efficiency.

On the other hand, since the lower edge of the second covering part 22 is provided close to the outer surface of the window glass 13c, and the rubber-made molding 16 is mounted along the lower edge thereof so that the configuration is made such that the tip end of the molding 16 is further close to the outer surface of the window glass 13c, even if an external force is applied to the side visor 11 and the tip end of the molding 16 comes into contact with the outer surface of the window glass 13c, the window glass 13c and the molding 16 are not damaged. Therefore, a gap between the lower edge of the second covering part 22 and the window glass 13c can be made extremely small, and the air in the cab 12 discharged to the outside of the cab 12 through the through holes 23a and 23b and the opening 19 can be prevented almost reliably from intruding again into the cab 12. Also, since the two ribs 17 and 18 are provided from the lower edges of the two through holes 23a and 23b to the outer surface of the second covering part 22 so as to extend substantially to the horizontal direction, the air in the cab 12 drawn through the through holes 23a and 23b is straightened, and the strength near the through holes 23a and 23b of the side visor 11 is increased. As a result, the air flow caused by the running of the truck 10 flows smoothly along the outer surface of the side visor 11 from the front part of the side visor 11 toward the rear part thereof. Therefore, wind noise is scarcely generated, and the decrease in strength of the side visor 11 caused by the formation of the through holes 23a and 23b can be restrained. The side visor of this embodiment can be applied to not only a truck but also cab-over-engine type automobiles of other kinds. Also, if the front frame of the side door is erected so as to tilt to the rear slightly with respect to the vertical direction, this side visor can also be applied to a passenger car such as a one box car.

Second Embodiment

Figure 14:
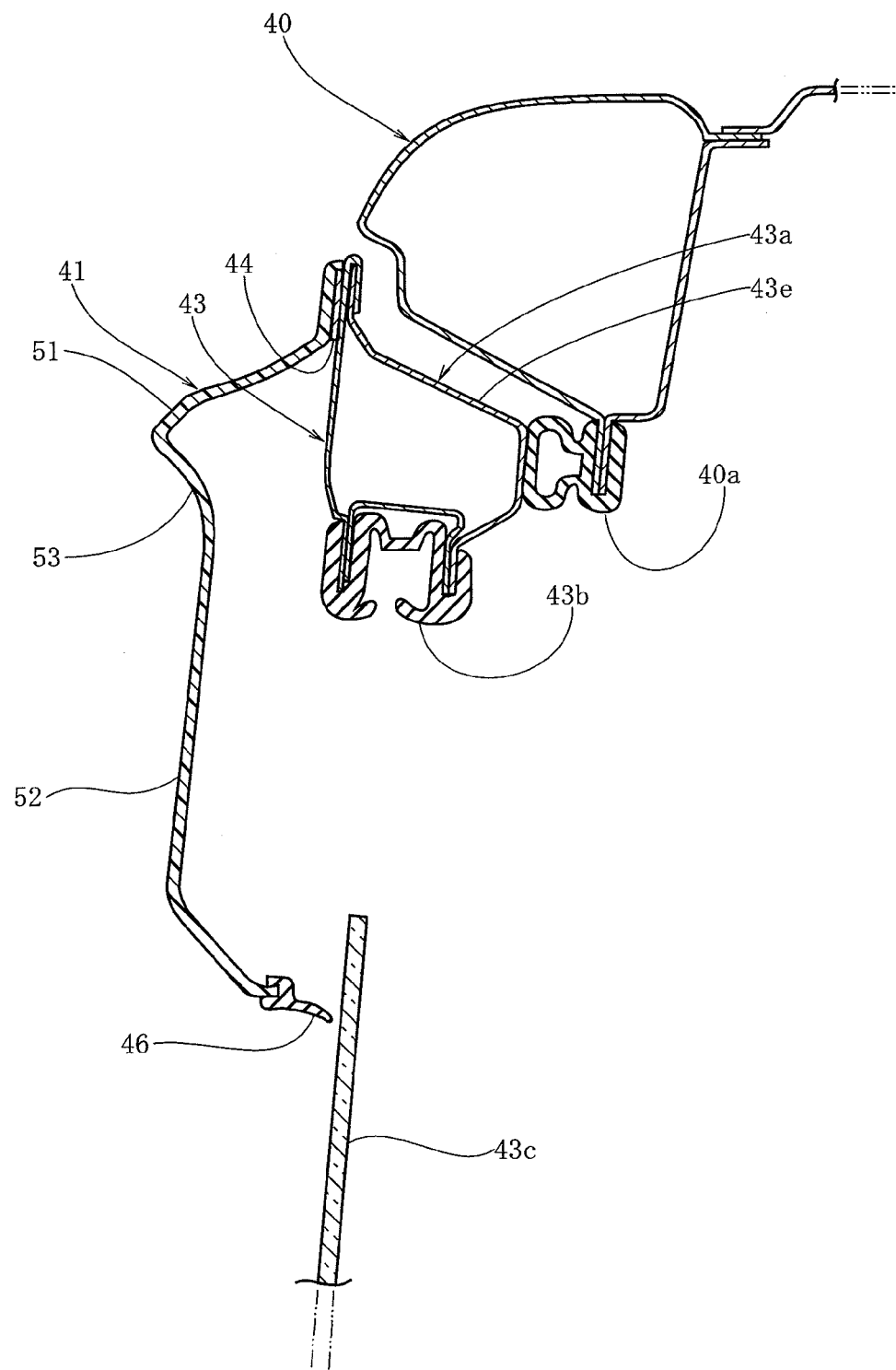
FIG. 14 is a sectional view taken along the line I-I of FIG. 10.
Figure 15:
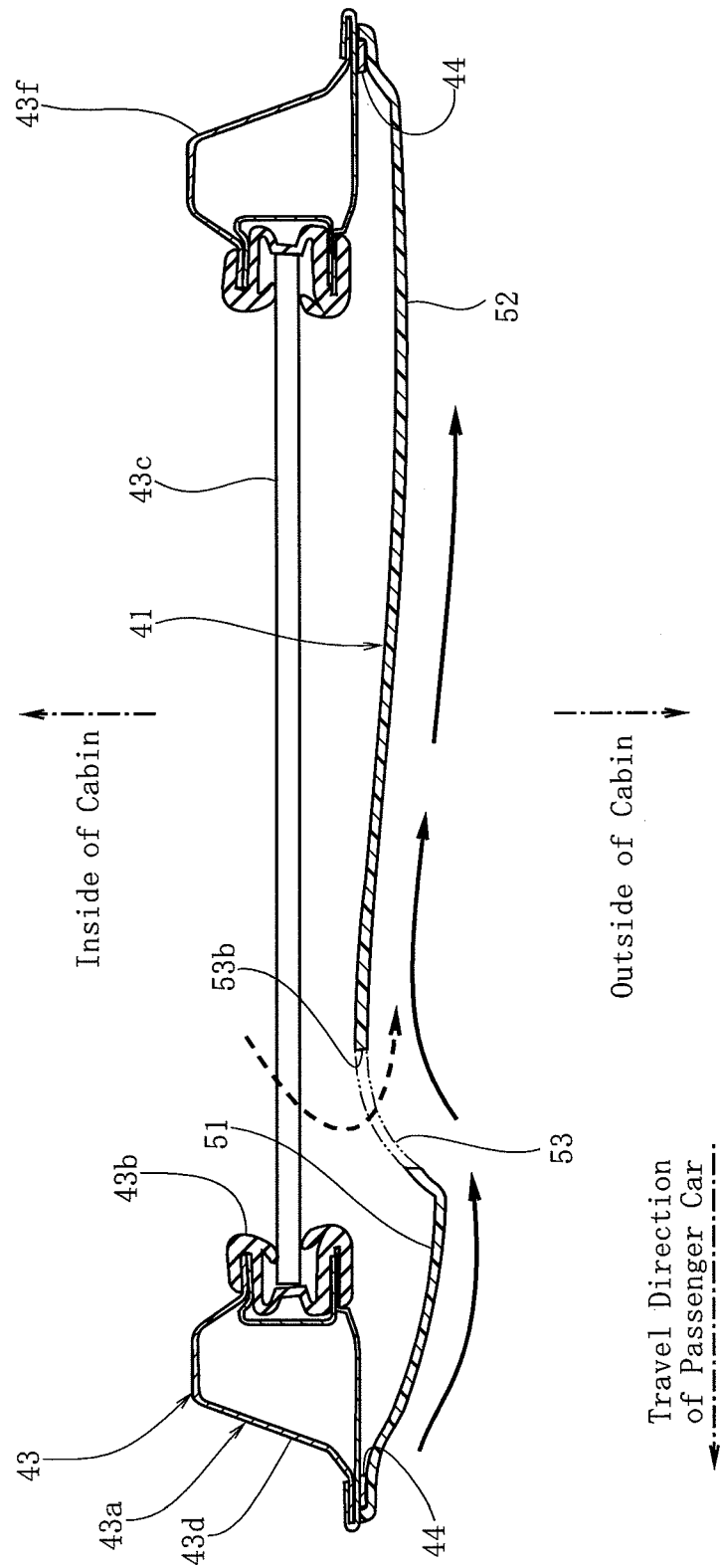
FIG. 15 is a sectional view taken along the line J-J of FIG. 10.
Figure 16:
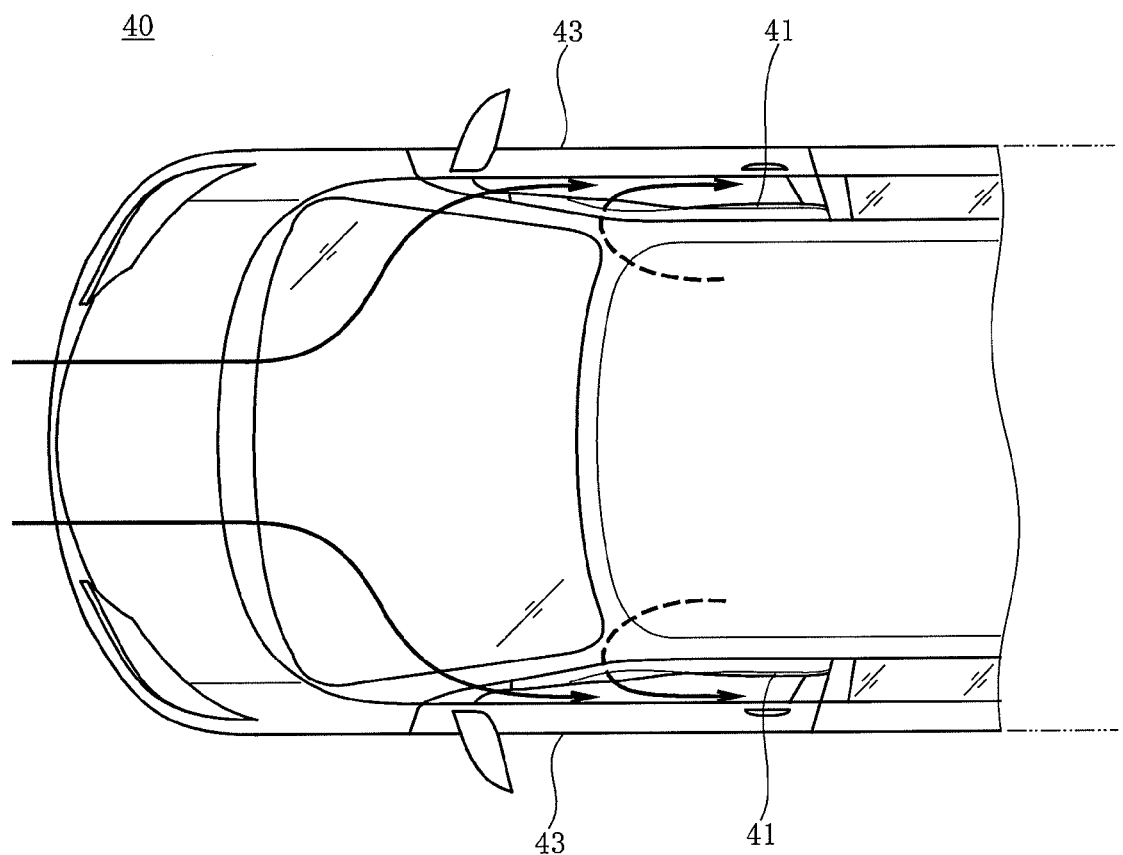
FIG. 16 is a plan view of an essential portion of a passenger car (cab-behind-engine type automobile) to which the side visor shown in FIG. 10 is mounted.
Figure 17:
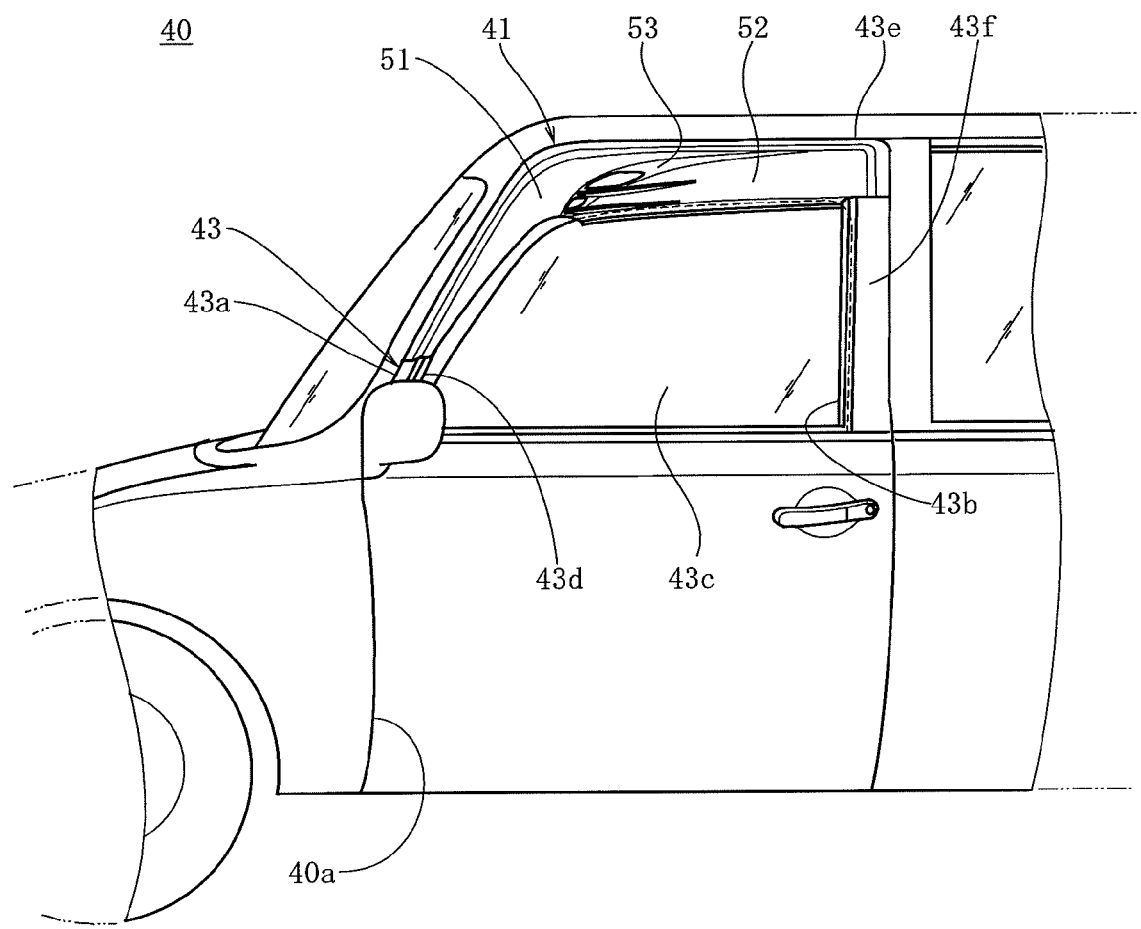
FIG. 17 is a side view of an essential portion of a passenger car (cab-behind-engine type automobile) to which the side visor shown in FIG. 10 is mounted.

FIGS. 10 to 17 show a second embodiment of the present invention. In this embodiment, a side visor 41 is mounted to a side door 43 of a cab-behind-engine type passenger car (FIGS. 16 and 17). Since the side visor 41 is symmetrical in the right-and-left direction with respect to the centerline of vehicle body, the side visor 41 mounted to the side door 43 on the assistant driver's seat side is explained exemplarily, and the explanation of the side visor 41 mounted to the side door 43 on the driver's seat side is omitted (FIG. 16). In the front side surface of the passenger car 40, a port 40a through which one gets on and off is provided, and this port 40a is closed openably by the side door 43 (FIG. 17). In the upper part of the side door 43, a door window 43b defined by a window frame 43a is formed, and the door window 43b is closed and opened by moving the window glass 43c up and down. The window frame 43a has a front frame part 43d provided on the front side of the side door 43 in such a manner as to extend upward so as to be tilted to the rear at a large angle from the vertical direction, an upper frame part 43e extending to the travel direction of the passenger car 40, and a rear frame part 43f provided on the rear side of the side door 43 so as to be erected substantially in the vertical direction. Also, the side door 43 is configured so that by moving the window glass 43c up, the door window 43b is closed by the window glass 43c, and by moving the window glass 43c down, the door window 43b is opened.

Figure 10:
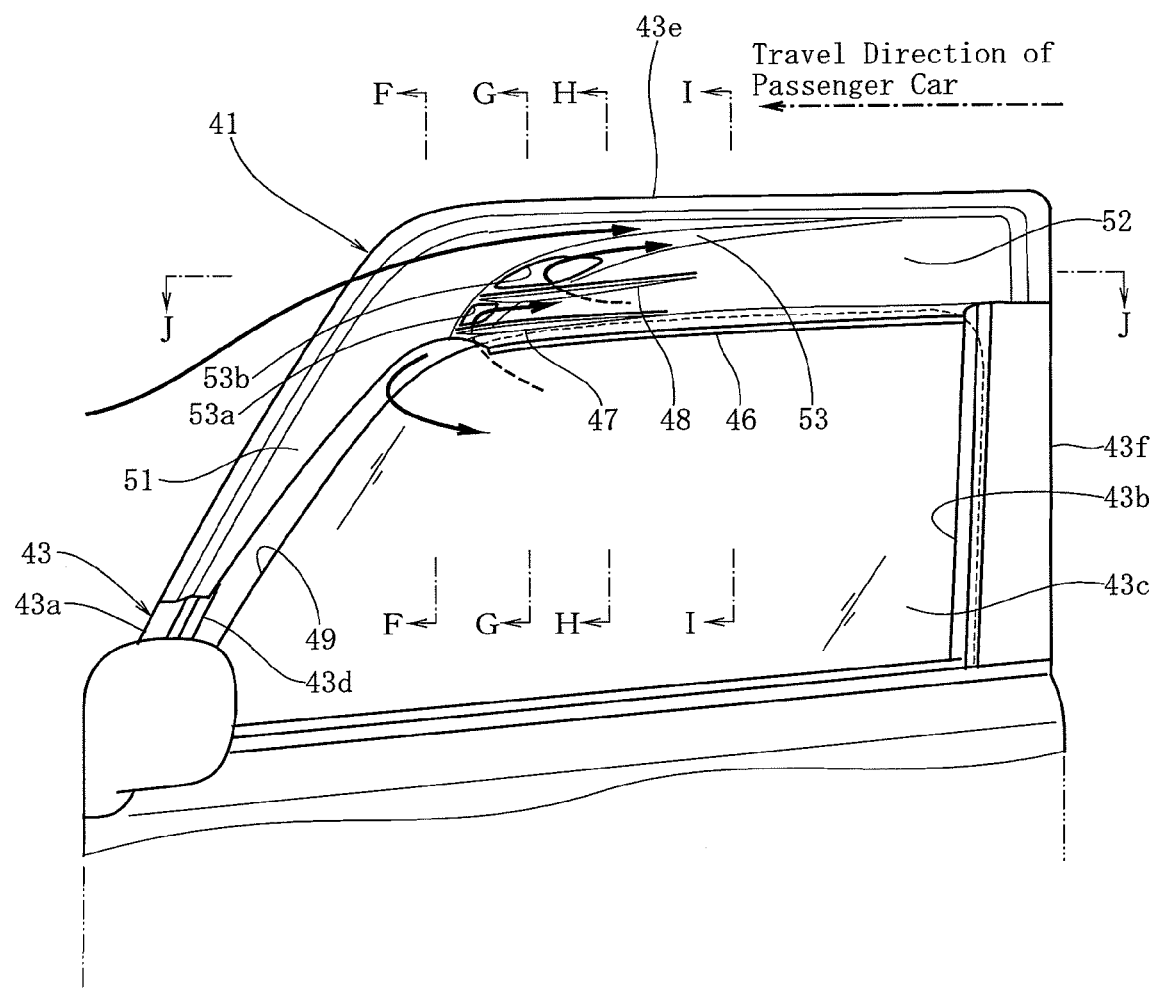
FIG. 10 is a perspective view of an essential portion of a side door of a passenger car (cab-behind-engine type automobile) to which a side visor in accordance with a second embodiment of the present invention is mounted, the side door being viewed substantially from the front.
Figure 11:
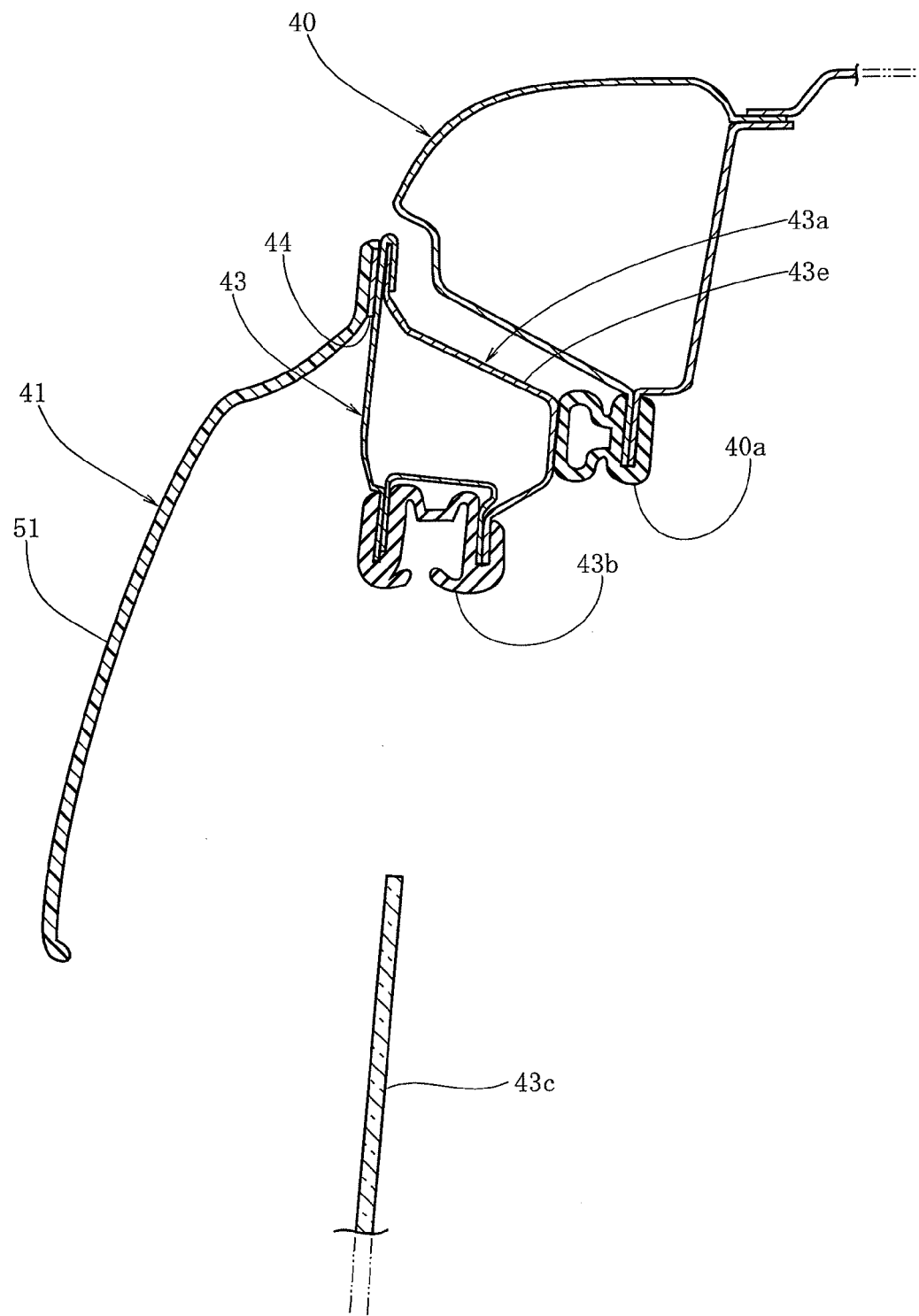
FIG. 11 is a sectional view taken along the line F-F of FIG. 10.

The side visor 41 is mounted to the front frame part 43d, the upper frame part 43e, and the rear frame part 43f of the window frame 43a with a pressure sensitive adhesive double coated tape 44 (FIGS. 11 to 15), and is configured so as to cover the front part and the upper part of the door window 43b from the outside (FIGS. 10 and 16). The side visor 41 is provided with a first covering part 51 covering a portion from the front part to the upper part of the door window 43b, a second covering part 52 covering a portion lower than the first covering part 51 of the upper part of the door window 43b, a third covering part 53 covering a portion between the first and second covering parts 51 and 52 in the upper part of the door window 43b by integrally connecting a portion located in the upper part of the door window 43b of the lower edge of the first covering part 51 and the upper edge of the second covering part 52, and two through holes 53a and 53b provided in the front part of the third covering part 53 (FIG. 10). The first to third covering parts 51 to 53 are formed integrally by injection molding of a translucent plastic. The first to third covering parts 51 to 53 may be integrally formed of an opaque plastic, not a translucent plastic, or may be integrally formed of a transparent plastic in the case where the side visor need not have a function of sunshade and needs to have only a function of ventilation in the cabin.

The first covering part 51 is configured so as to expand to the outside in the vehicle width direction and so that the lower surface thereof is open (FIGS. 10 to 14). Also, the first covering part 51 is formed so that the width in the travel direction of the passenger car 40 decreases gradually toward the lower front and is accommodated in the width of the front frame part 43d, and so that the width in the vertical direction decreases gradually toward the upper rear and is accommodated in the width of the upper frame part 43e (FIG. 10). Further, the front rear edge of the first covering part 51 is formed curvedly so as to project to the front, and the upper lower edge of the first covering part 51 is formed curvedly so as to project to the upside. The front part of the first covering part 51 is provided so as to extend to the lower part of the front frame part 43*d*.

Figure 12:
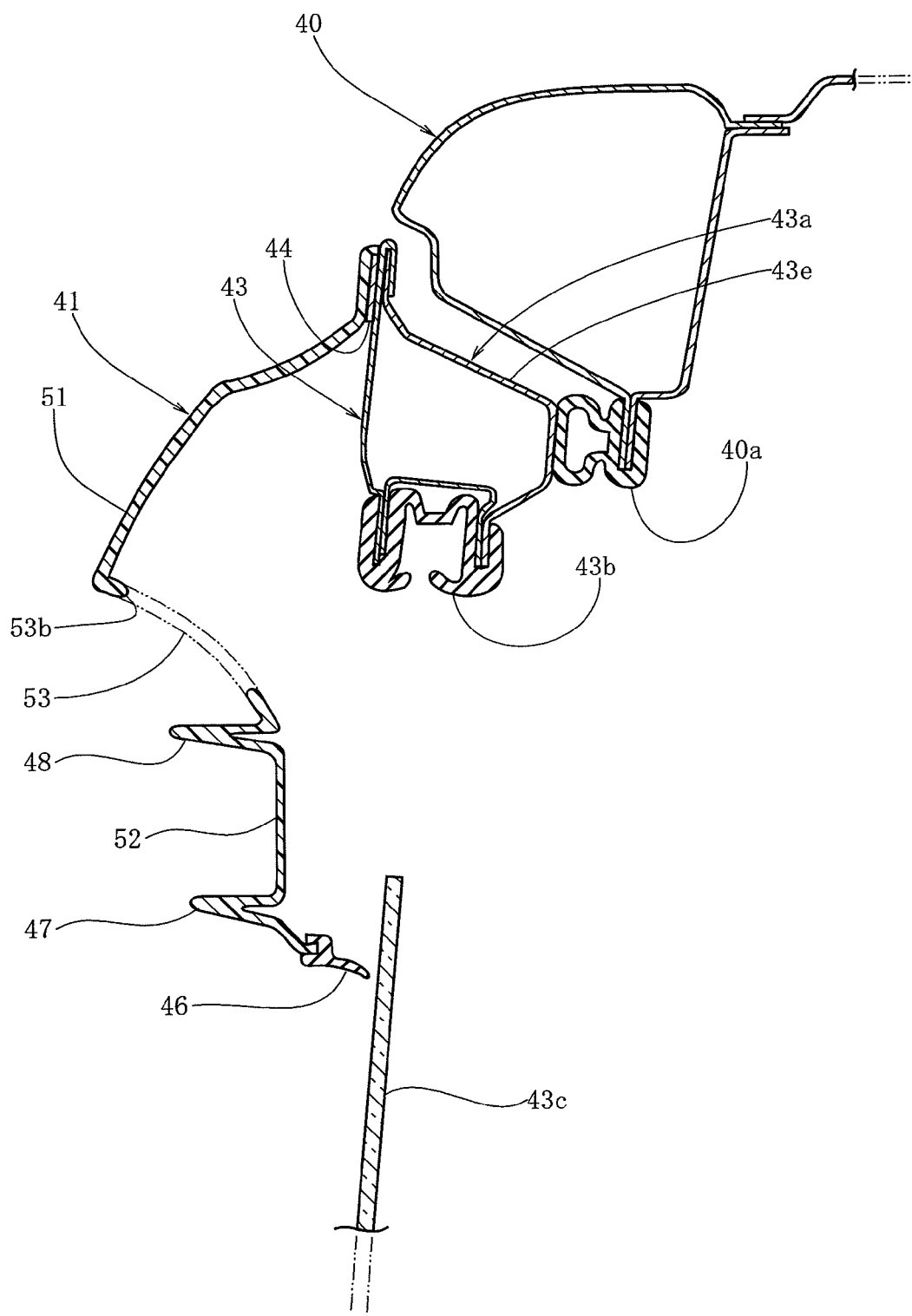
FIG. 12 is a sectional view taken along the line G-G of FIG. 10.
Figure 13:
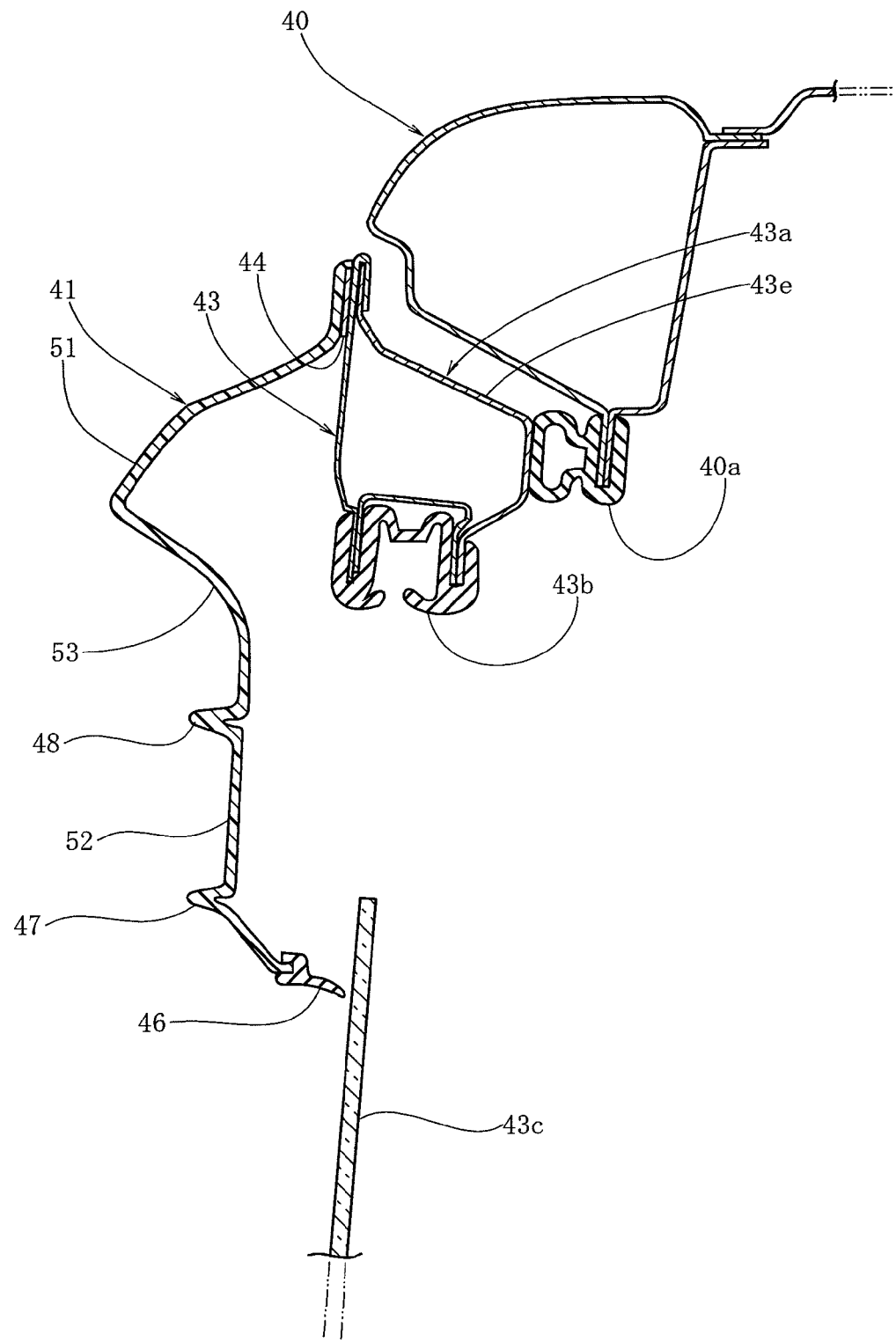
FIG. 13 is a sectional view taken along the line H-H of FIG. 10.

The second covering part 52 is provided so as to be on the outside of the window glass 43*c* that closes the door window 43*b*, and be located on the inside in the vehicle width direction of the lower edge of the first covering part 51 (FIGS. 12 to 14). Also, the second covering part 52 is formed so as to gradually approach the window glass 43*c* from the rear end toward the front end, in other words, is formed so as to gradually separate from the window glass 43*c* from the front end toward the rear end (FIG. 15). Also, the second covering part 52 is formed so that the width in the vertical direction decreases gradually from the rear end toward the front end, in other words, is formed so that the width in the vertical direction increases gradually from the front end toward the rear end (FIG. 10). The upper edge of the second covering part 52 is formed curvedly so as to project to the upside. Further, the lower edge of the second covering part 52 is formed so as to extend to the travel direction of the passenger car 40 (FIG. 10), is projectingly provided toward the outer surface of the window glass 43*c* in the vehicle width direction, and is provided close to the outer surface of the window glass 43*c* (FIGS. 12 to 14). At the lower edge of the second covering part 52, a rubber-made molding 46 is mounted along the lower edge thereof. The molding 46 is configured so that the tip end thereof projects toward the outer surface of the window glass 43*c* and comes closer to the outer surface of the window glass 43*c* than the lower edge of the second covering part 52.

The third covering part 53 is provided in such a manner as to be curved so as to project to the upside, and extend to the slantwise upside from the front end toward the rear end. Also, the third covering part 53 is provided so as to extend to the slantwise upside from the upper edge of the second covering part 52 toward the lower edge of the first covering part 51 in the vehicle width direction. Further, the front part of the third covering part 53 is formed curvedly so as to project toward the window glass 43*c* in the vehicle width direction (FIGS. 12 and 15). The radius of curvature of a curved portion in the front part of the third covering part 53 is set relatively large. On the other hand, the two through holes 53*a* and 53*b* are disposed along the lengthwise direction of the third covering part 53 so as to be curved upward from the front end of the third covering part 53. Also, two ribs 47 and 48 are provided from the lower edges of the two through holes 53*a* and 53*b* to the outer surface of the second covering part 52 so as to extend substantially to the horizontal direction. These ribs 47 and 48 are formed integrally with the first to third covering parts 51 to 53 (FIGS. 12 and 13). Further, the ribs 47 and 48 are formed so that the heights thereof are at a maximum near a connecting portion between the second covering part 52 and the third covering part 53. The ribs 47 and 48 are formed so that the heights thereof decrease gradually from the connecting portion toward the front, and decrease gradually from the connecting portion toward the rear. However, the tip end faces (upper faces) of the ribs 47 and 48 are configured in a gentle curved shape close to a straight line over the lengthwise direction of the rib 47, 48.

The operation of the side visor 41 for the passenger car 40 configured as described above is explained. When a cabin is ventilated during the time when the passenger car 40 is running, the window glass 43*c* is lowered so that the upper edge of the window glass 43*c* is located slightly above the lower edge of the side visor 41, that is, the window glass 43*c* is lowered so that the tip end of the molding 46 of the side visor 41 projects toward the outer surface slightly lower than the upper end of the window glass 43*c* (FIG. 10). At this time, an air flow directed from the front part of the side visor 41 toward the rear part thereof is produced along the outer surface of the side visor 41 by the running of the passenger car 40. This air flow is made faster by passing through the outer surface of the first covering part 51 expanding to the outside in the vehicle width direction, and is further accelerated by successively passing through the outer surface of the third covering part 53 and the outer surface of the second covering part 52. As a result, by a high-speed air flow passing through the outsides of the through holes 53*a* and 53*b* of the third covering part 53, the static pressure of air on the outsides of the through holes 53*a* and 53*b* is made extremely low with respect to the static pressure of air in the cabin, and is made extremely low with respect to the static pressure of air on the outside of an opening 49 between the front rear edge of the side visor 41 and the front edge of the door window 43*b*. Therefore, the air in the cabin is drawn through the opened door window 43*b* and through holes 53*a* and 53*b*, and is discharged to the outside of the vehicle rapidly. For the passenger car of this embodiment, since the height of the front part of the opened door window 43*b* is small, the width in the vertical direction for drawing the air in the cabin through the opening 49 is narrow. However, by the formation of the through holes 53*a* and 53*b* in the front part of the third covering part 53, the air in the cabin can be drawn also through the through holes 53*a* and 53*b* in addition to the front part of the opened door window 43*b*. That is, the air in the cabin can be drawn from a relatively wide width in the vertical direction that is a width obtained by adding the widths in the vertical direction of the through holes 53*a* and 53*b* to the width in the vertical direction of the front part of the opened door window 43*b*. Also, since the second covering part 52 is formed so as to gradually approach the window glass 43*c* from the rear end toward the front end, that is, the second covering part 52 is formed so as to gradually separate from the window glass 43*c* from the front end toward the rear end, when passing through the outsides of the through holes 53*a* and 53*b*, the air flow having drawn the air in the cabin flows smoothly along the outer surface of the second covering part 52 without coming off the outer surface of the second covering part 52 (FIG. 15). Therefore, wind noise is scarcely generated, and the cabin can be ventilated with high efficiency.

On the other hand, since the lower edge of the second covering part 52 is provided close to the outer surface of the window glass 43*c*, and the rubber-made molding 46 is mounted along the lower edge thereof so that the configuration is made such that the tip end of the molding 46 is further close to the outer surface of the window glass 43*c*, even if an external force is applied to the side visor 41 and the tip end of the molding 46 comes into contact with the outer surface of the window glass 43*c*, the window glass 43*c* and the molding 46 are not damaged. Therefore, a gap between the lower edge of the second covering part 52 and the window glass 43*c* can be made extremely small, and the air in the cabin discharged to the outside of the cabin through the through holes 53*a* and 53*b* and the opening 49 can be prevented almost reliably from intruding again into the cabin. Also, since the two ribs 47 and 48 are provided from the lower edges of the two through holes 53*a* and 53*b* to the outer surface of the second covering part 52 so as to extend substantially to the horizontal direction, the air in the cabin drawn through the through holes 53*a* and 53*b* is straightened, and the strength near the through holes 53*a* and 53*b* of the side visor 41 is increased. As a result, the air flow caused by the running of the passenger car 40 flows smoothly along the outer surface of the side visor 11 from the front part of the side visor 41 toward the rear part thereof. Therefore, wind noise is scarcely generated, and the decrease in strength of the side visor 41 caused by the formation of the through holes 53*a* and 53*b* can be restrained. The side visor of this embodiment can be applied to not only a passenger car but also cab-behind-engine type automobiles of other kinds. Also, if the front frame of the side door is extended upward so as to tilt to the rear at a large angle with respect to the vertical direction, this side visor can also be applied to an automobile such as a cab-behind-engine truck.

Third Embodiment

Figure 18:
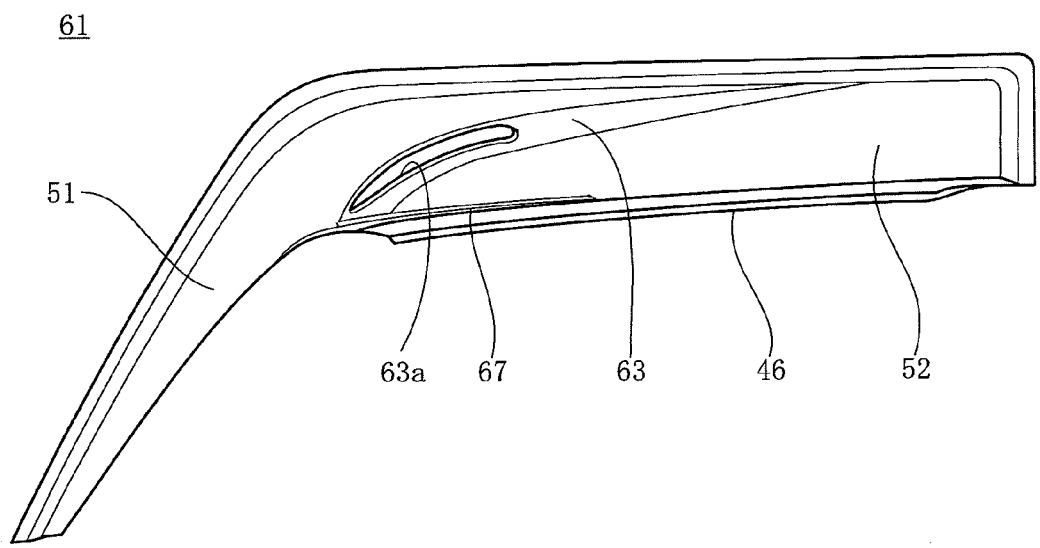
FIG. 18 is a front view of a side visor for a passenger car (cab-behind-engine type automobile) in accordance with a third embodiment of the present invention is mounted.

FIG. 18 shows a side visor 61 in accordance with a third embodiment of the present invention. In FIG. 18, the same symbols denote the same elements as those in FIG. 10. In this embodiment, a single through hole 63a is provided so as to be curved upward from the front end of a third covering part 63 and extend to the lengthwise direction of the third covering part 63. Also, a single rib 67 is provided from the lower edge of the single through hole 63a to the outer surface of the second covering part 52 so as to extend substantially to the horizontal direction. The rib 67 is formed integrally with the first to third covering parts 51, 52 and 63. The configurations other than those described above are the same as the configurations of the second embodiment. For the side visor 61 for passenger car configured as described above, since the single through hole 63a is provided so as to be curved upward from the front end of the third covering part 63 and extend to the lengthwise direction of the third covering part 63, the width in the vertical direction of the through hole 63a for drawing the air in the cabin increases. As a result, the air in the cabin can be drawn easily, so that the cabin can be ventilated with high efficiency. The operations other than those described above are the same as the operations in the second embodiment, so that repeated explanation thereof is omitted.

Fourth Embodiment

Figure 19:
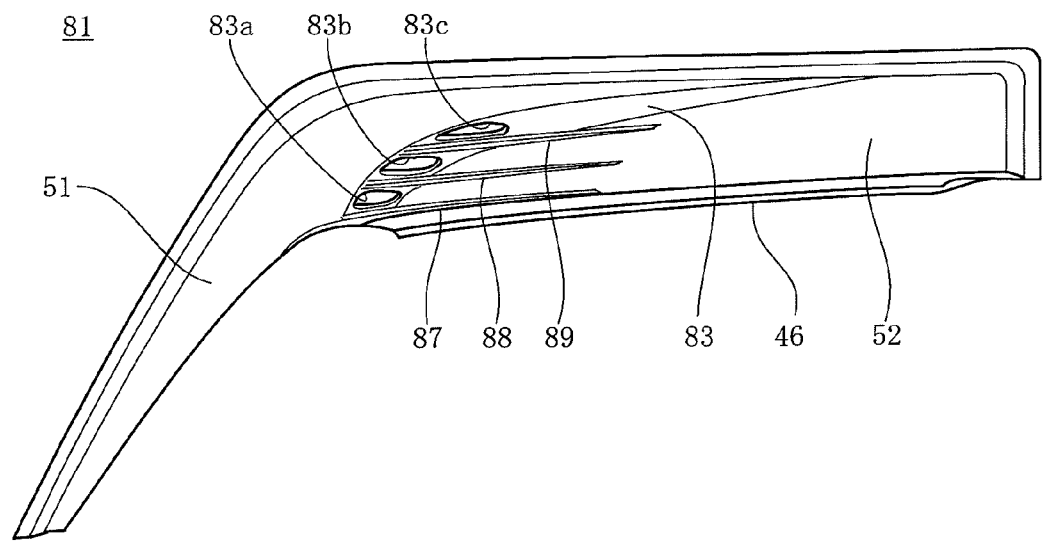
FIG. 19 is a front view of a side visor for a passenger car (cab-behind-engine type automobile) in accordance with a fourth embodiment of the present invention is mounted.
Figure 20:
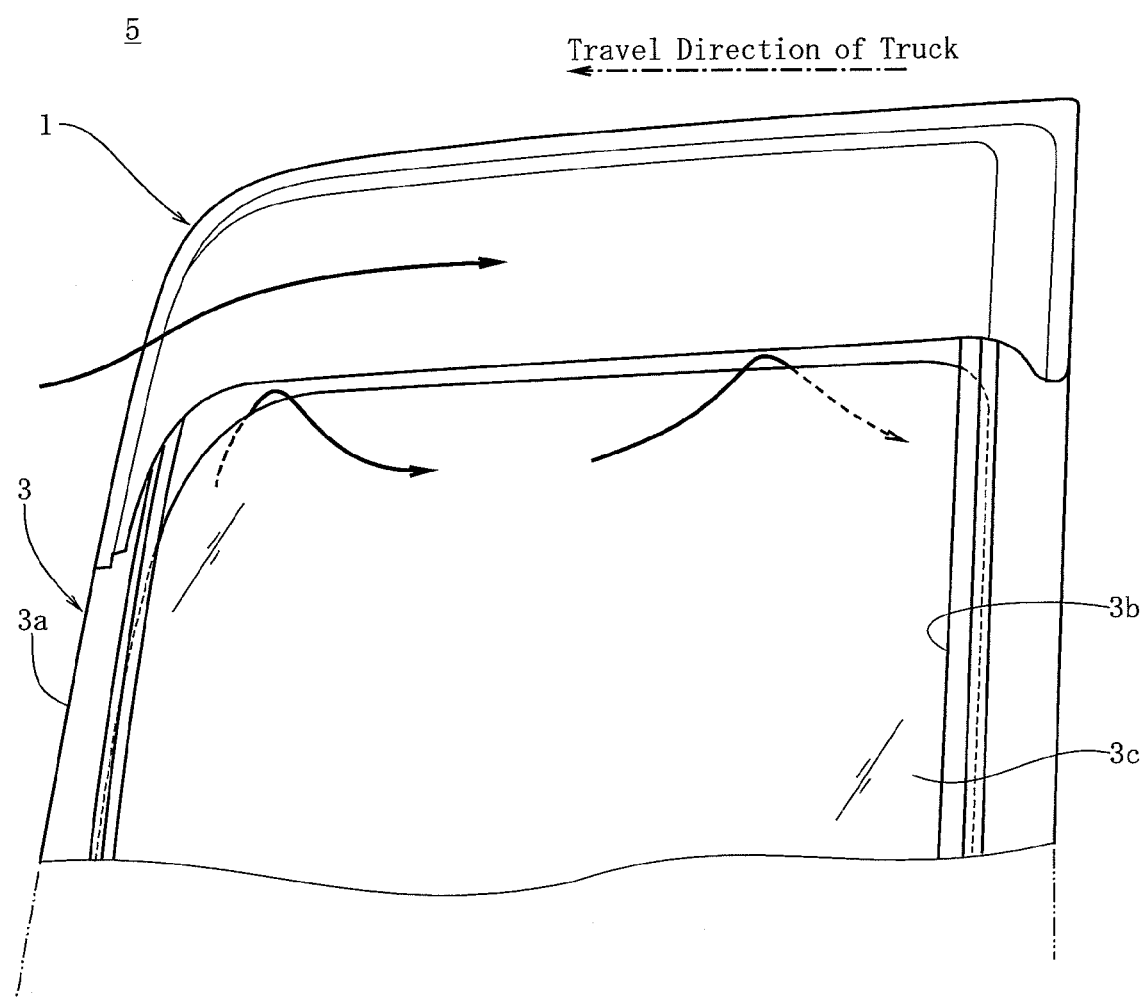
FIG. 20 is a perspective view of an essential portion of a side door with a side visor corresponding to that shown in FIG. 1, showing a conventional example of side visor.

FIG. 19 shows a side visor 81 in accordance with a fourth embodiment of the present invention. In FIG. 19, the same symbols denote the same elements as those in FIG. 10. In this embodiment, three through holes 83a to 83c are provided so as to be curved upward from the front end of a third covering part 83 and extend to the lengthwise direction of the third covering part 83. Also, three ribs 87 to 89 are provided from the lower edge of the three through holes 83a to 83c to the outer surface of the second covering part 52 so as to extend substantially to the horizontal direction. The ribs 87 to 89 are formed integrally with the first to third covering parts 51, 52 and 83. The configurations other than those described above are the same as the configurations of the second embodiment. For the side visor 81 for passenger car configured as described above, since the three through holes 83a to 83c are provided so as to be curved upward from the front end of the third covering part 83 and extend to the lengthwise direction of the third covering part 83, the widths in the vertical direction of the through holes 83a to 83c for drawing the air in the cabin increase, and also the through holes 83a to 83c can be made relatively small. As a result, the air in the cabin can be drawn easily, so that the cabin can be ventilated with high efficiency, and also the strength near the through holes 83a to 83c of the side visor 81 increases. Therefore, the decrease in strength of the side visor 81 caused by the formation of the through holes 83a to 83c can be restrained. The operations other than those described above are the same as the operations in the second embodiment, so that repeated explanation thereof is omitted.

What is claimed is:

1. A side visor for automobile which is mounted to a window frame defining a door window of a side door to cover the front part and upper part of the door window from the outside, comprising:
a first covering part configured so as to cover a portion from the front part to the upper part of the door window and expand to the outside in a vehicle width direction and so that a lower surface thereof is open;
a second covering part which covers a portion lower than the first covering part of the upper part of the door window, is provided so as to be on the outside of a window glass that openably closes the door window, and be located on the inside in the vehicle width direction of a lower edge of the first covering part, and is formed so as to gradually approach the window glass from a rear end toward a front end, the lower edge thereof being provided close to an outer surface of the window glass;
a third covering part which covers a portion between the first and second covering parts in the upper part of the door window by integrally connecting a portion located in the upper part of the door window of the lower edge of the first covering part and the upper edge of the second covering part, and is provided in such a manner as to be curved so as to project to the upside, and extend to a slantwise upside from the front end toward the rear end and extend to the slantwise upside from the upper edge of the second covering part toward the lower edge of the first covering part in the vehicle width direction; and
at least one through hole provided in the front part of the third covering part.

2. The side visor for automobile according to claim 1, wherein at least one rib is provided from the at least one through holes to the outer surface of the second covering part so as to extend substantially to the horizontal direction.

3. The side visor for automobile according to claim 1, wherein a rubber-made molding is mounted along the lower edge of the second covering part so that the configuration is made such that the tip end of the molding is further close to the outer surface of the window glass.

4. The side visor for automobile according to claim 1, wherein the at least one through hole is defined by a single through hole provided so as to be curved upward from the front end of the third covering part and extend to the lengthwise direction of the third covering part.

5. The side visor for automobile according to claim 2, wherein the at least one through hole is defined by a single through hole provided so as to be curved upward from the front end of the third covering part and extend to the lengthwise direction of the third covering part.

6. The side visor for automobile according to claim 3, wherein the at least one through hole is defined by a single through hole provided so as to be curved upward from the front end of the third covering part and extend to the lengthwise direction of the third covering part.

7. The side visor for automobile according to claim 1, wherein the at least one through hole is defined by a plurality of through holes provided so as to be curved upward from the front end of the third covering part and extend along the lengthwise direction of the third covering part.

8. The side visor for automobile according to claim 2, wherein the at least one through hole is defined by a plurality of through holes provided so as to be curved upward from the front end of the third covering part and extend along the lengthwise direction of the third covering part.

9. The side visor for automobile according to claim 3, wherein the at least one through hole is defined by a plurality of through holes provided so as to be curved upward from the front end of the third covering part and extend along the lengthwise direction of the third covering part.

* * * * *